United States Patent [19]
Kuribayashi et al.

[11] Patent Number: 4,709,995
[45] Date of Patent: Dec. 1, 1987

[54] FERROELECTRIC DISPLAY PANEL AND DRIVING METHOD THEREFOR TO ACHIEVE GRAY SCALE

[75] Inventors: Masaki Kuribayashi, Higashikurume; Toshihiko Nakazawa; Junichiro Kanbe, both of Yokohama, all of Japan

[73] Assignee: Canon Kabushiki Kaisha, Tokyo, Japan

[21] Appl. No.: 763,432

[22] Filed: Aug. 7, 1985

[30] Foreign Application Priority Data

Aug. 18, 1984 [JP] Japan .................. 59-172231
Jul. 5, 1985 [JP] Japan .................. 60-148872
Jul. 5, 1985 [JP] Japan .................. 60-148873
Jul. 5, 1985 [JP] Japan .................. 60-148874

[51] Int. Cl.[4] ............................... G02F 1/13
[52] U.S. Cl. .................. 350/350 S; 350/333
[58] Field of Search ............... 350/333, 350 S

[56] References Cited
U.S. PATENT DOCUMENTS 4,508,429  4/1985  Nagae et al. ............. 350/350 S
4,548,476 10/1985  Kaneko .................... 350/350 S
4,591,886  5/1986  Umeda et al. ............ 350/350 S X
4,634,226  1/1987  Isogai et al. ............. 350/350 S
4,655,561  4/1987  Kanbe et al. ............. 350/333 X Primary Examiner—Stanley D. Miller
Assistant Examiner—Richard F. Gallivan
Attorney, Agent, or Firm—Fitzpatrick, Cella, Harper & Scinto

[57] ABSTRACT

A display panel comprising a liquid crystal device comprising a plurality of picture elements arranged in a plurality of rows and columns, each picture element comprising a ferroelectric crystal under bistability condition showing either a first or a second orientation state; means for orienting the ferroelectric liquid crystal to either one of the first and second orientation states at respective picture elements; and means for controlling the duration of the first or second orientation state at respective picture elements.

68 Claims, 95 Drawing Figures

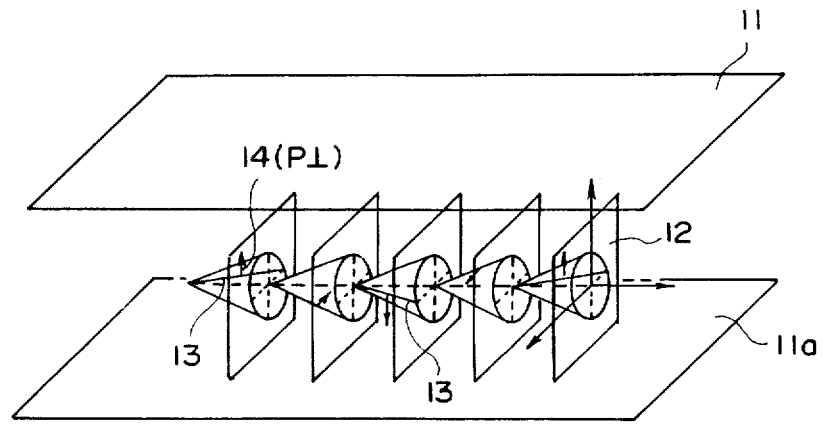
F I G. 1
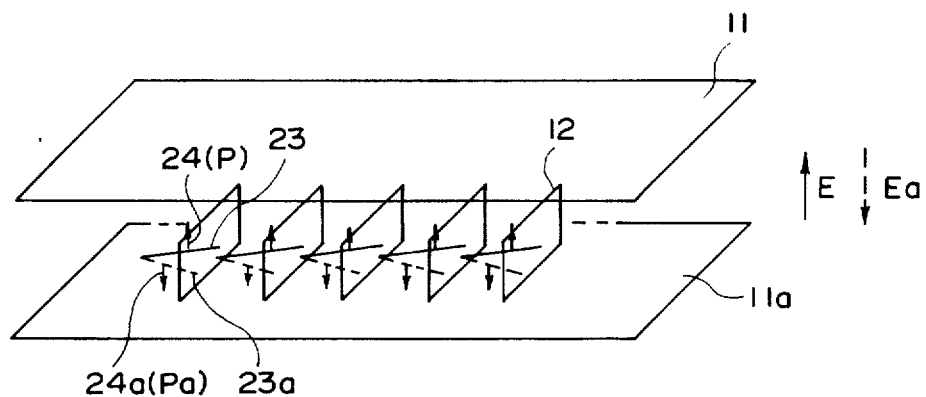
F I G. 2

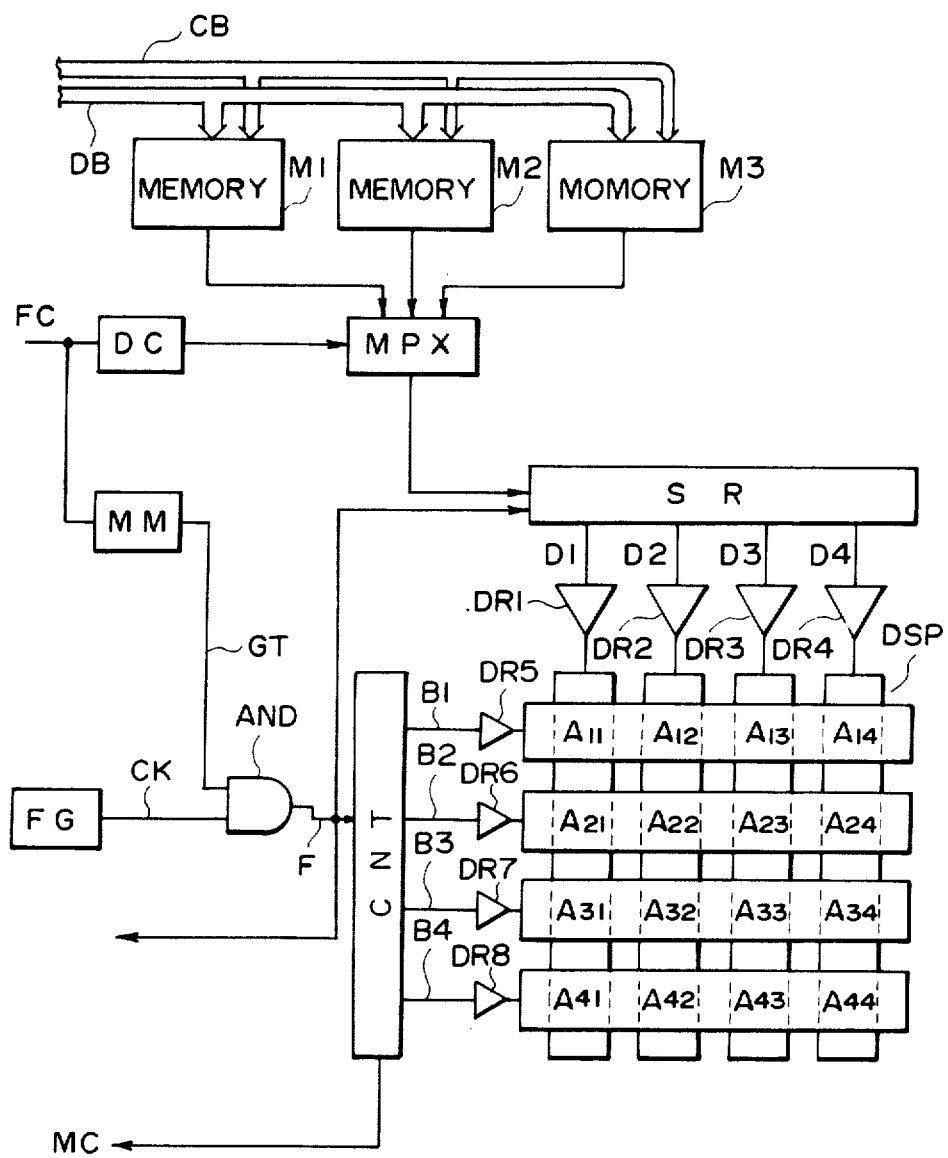
F I G. 3

| ADDRESS | DATA | | |
|---|---|---|---|
| A11 | 0 | 1 | 0 |
| A12 | 0 | 1 | 0 |
| A13 | 0 | 0 | 1 |
| A14 | 1 | 0 | 0 |
| A21 | 1 | 1 | 0 |
| A22 | 0 | 1 | 1 |
| A23 | 1 | 0 | 1 |
| A24 | 1 | 0 | 1 |
| A31 | 0 | 1 | 1 |
| A32 | 0 | 1 | 1 |
| A33 | 1 | 0 | 0 |
| A34 | 0 | 0 | 1 |
| A41 | 0 | 0 | 0 |
| A42 | 1 | 1 | 1 |
| A43 | 0 | 1 | 1 |
| A44 | 1 | 1 | 0 |

FIG. 4

| 0 | 0 | 0 | 1 | ~M3 |
|---|---|---|---|---|
| 1 | 0 | 1 | 1 | |
| 0 | 0 | 1 | 0 | |
| 0 | 1 | 0 | 1 | |

FIG. 5A

| 1 | 1 | 0 | 0 | ~M2 |
|---|---|---|---|---|
| 1 | 1 | 0 | 0 | |
| 1 | 1 | 0 | 0 | |
| 0 | 1 | 1 | 1 | |

FIG. 5B

| 0 | 0 | 1 | 0 | ~M1 |
|---|---|---|---|---|
| 0 | 1 | 1 | 1 | |
| 1 | 1 | 0 | 1 | |
| 0 | 1 | 1 | 0 | |

FIG. 5C

| 2 | 2 | 1 | 4 |
|---|---|---|---|
| 6 | 3 | 5 | 5 |
| 3 | 3 | 4 | 1 |
| 0 | 7 | 3 | 6 |

FIG. 5D

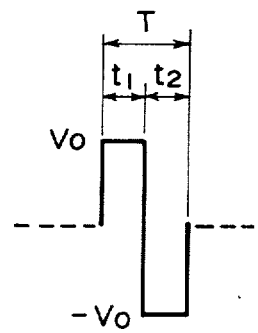
F I G. 10A
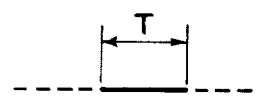
F I G. 10B
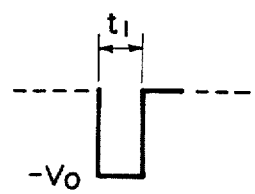
F I G. 10C
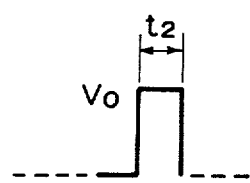
F I G. 10D

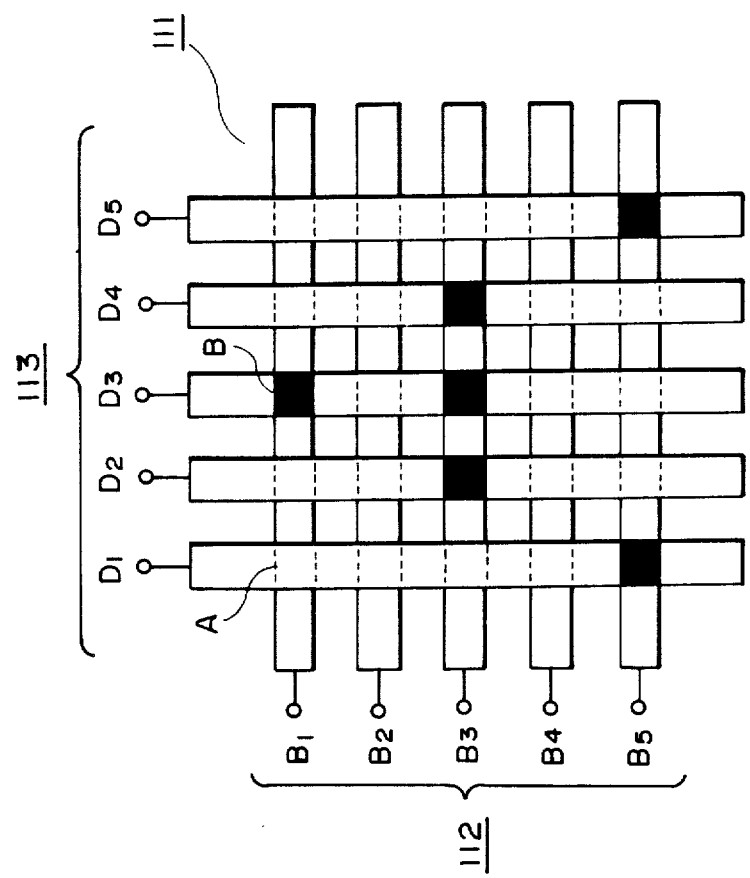
F I G. 11

F I G. 13
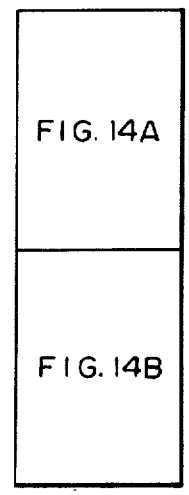
F I G. 14

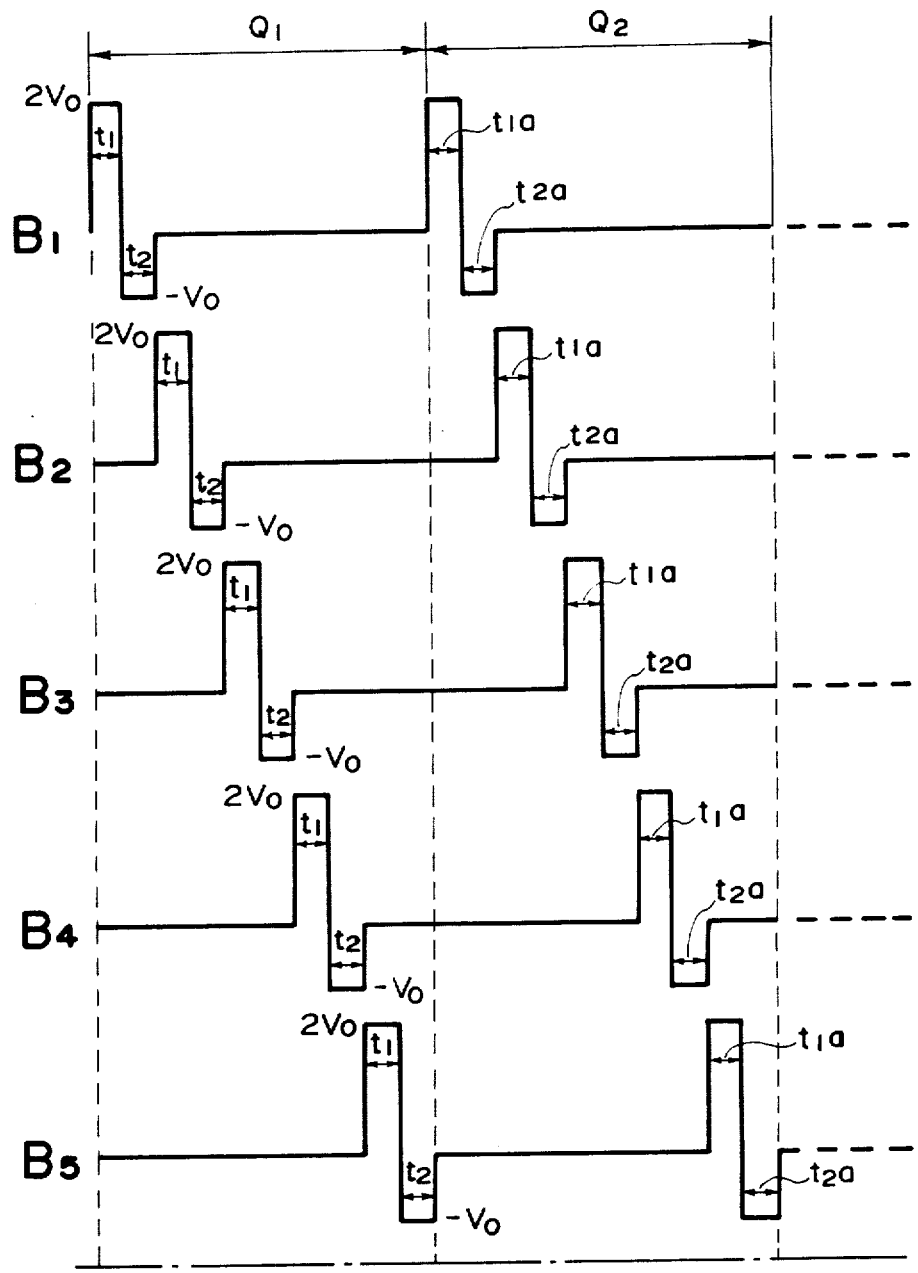
F I G. 13A

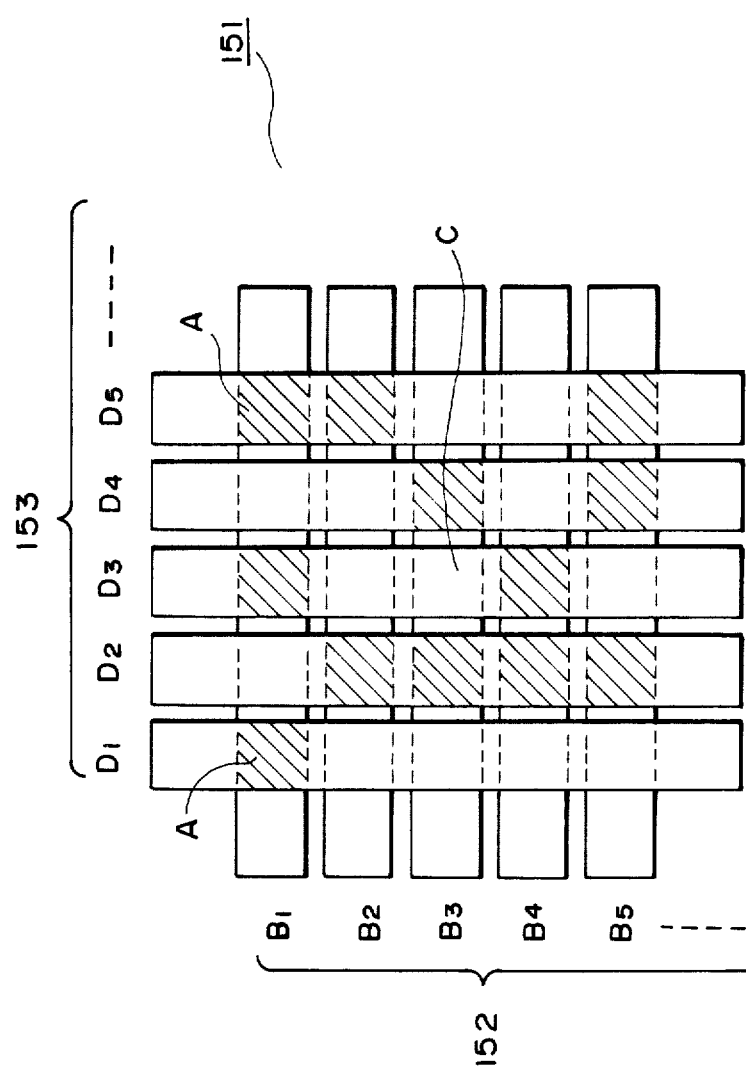
F I G. 15

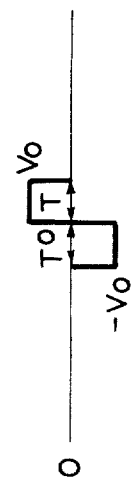
FIG. 18A
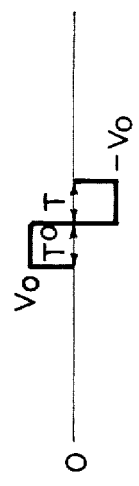
FIG. 18B
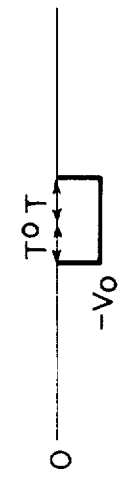
FIG. 18C
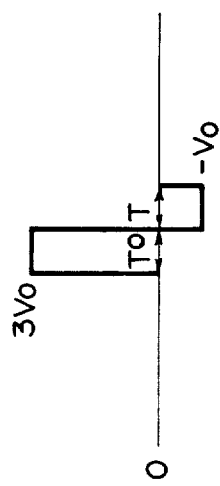
FIG. 18D
FIG. 18E
FIG. 18F
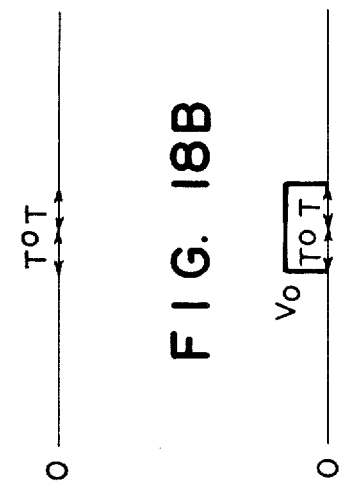

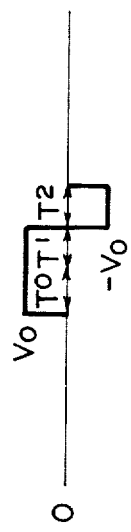
FIG. 22D
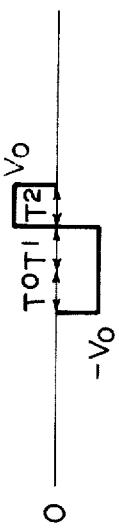
FIG. 22E
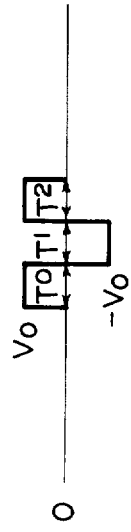
FIG. 22F
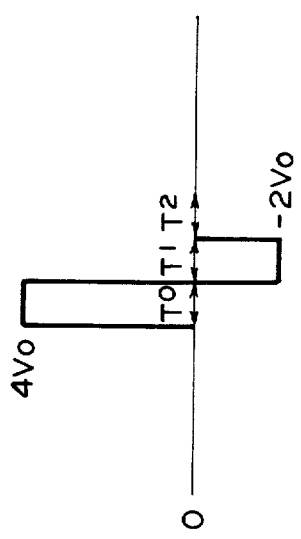
FIG. 22A
FIG. 22B
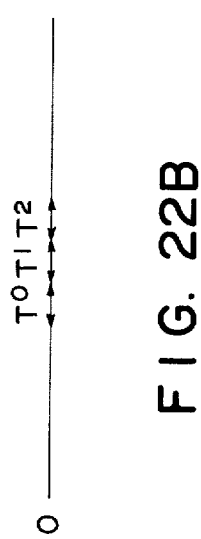
FIG. 22C

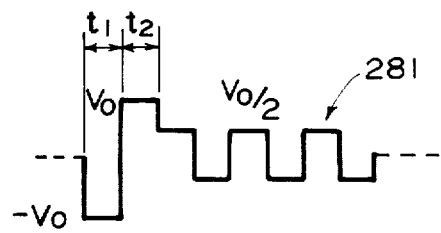
F I G. 28A
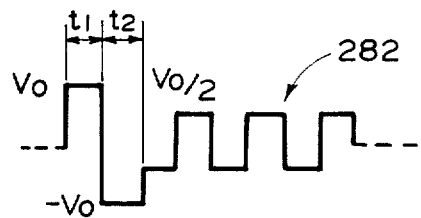
F I G. 28B
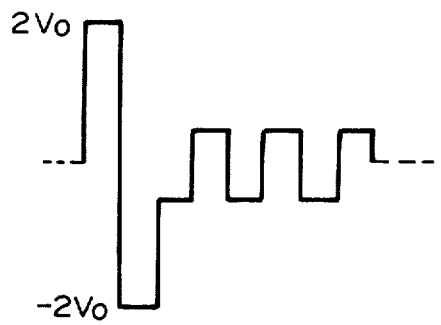
F I G. 28C
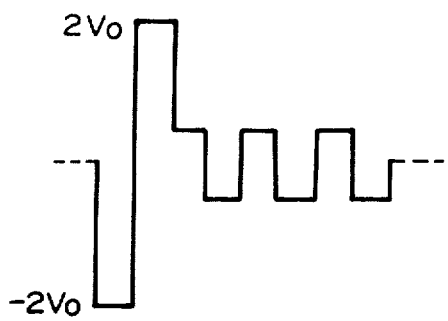
F I G. 28E
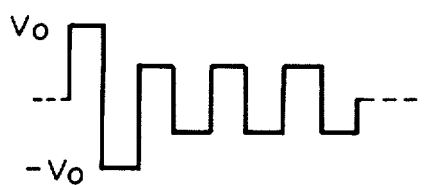
F I G. 28D
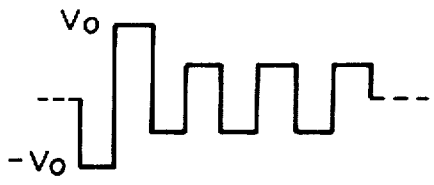
F I G. 28F

FERROELECTRIC DISPLAY PANEL AND DRIVING METHOD THEREFOR TO ACHIEVE GRAY SCALE

FIELD OF THE INVENTION AND RELATED ART

The present invention relates to a display panel for gradational or tonal display and a driving method therefor and, more particularly, to a display panel such as that of a liquid crystal television set using a liquid crystal material having bistability, particularly a ferroelectric liquid crystal and a driving method therefor.

In the conventional display panel of the active matrix driving system for a liquid crystal television set, thin film transistors (TFTs) are arranged in a matrix corresponding to respective picture elements. When a gate-on pulse is applied to a TFT to turn on the source-drain channel, a picture image signal is applied to the source and stored in a capacitor. A liquid crystal (e.g., TN (twisted nematic) liquid crystal) is driven by the stored image signal and a gradational display is effected by voltage modulation of picture elements.

However, such a television display panel of the active matrix driving system using a TN liquid crystal uses a complicated structure of TFTs requiring a large number of production steps and correspondingly has a high production cost. Moreover, there is a further problem that it is difficult to provide a large area of semiconductor film (e.g., of polysilicon, amorphous silicon) constituting TFTs.

On the other hand, a display panel of a passive matrix driving type using a TN liquid crystal has a low production cost. However, in this type of liquid crystal display panel, when the number (N) of scanning lines is increased, a time period (duty factor) during which one selected point is subjected to an effective electric field during the time when one frame is scanned is decreased at a ratio of 1/N, whereby crosstalk occurs and a picture with a high contrast cannot be obtained. Furthermore, as the duty factor is decreased, it is difficult to control gradation of respective picture elements by means of voltage modulation so that this type of display is not adapted for a display panel of a high picture element or wiring density, particularly one for a liquid crystal television panel.

SUMMARY OF THE INVENTION

A principal object of the present invention is, in view of the above-mentioned problems of the prior art, to provide a passive matrix driving system adapted for gradational display using a display panel having a high density of picture elements over a wide area, particularly a liquid crystal television panel.

The term "gradational display" as used herein means a display of a picture with a gradation, i.e., a picture with gradual or stepwise change in tones or shades or with more than two distinguishable tones or shades including a half tone.

According to a broad aspect of the present invention, there is provided a display panel comprising: a liquid crystal device comprising a plurality of picture elements arranged in a plurality of rows and columns, each picture element comprising a ferroelectric crystal under bistability condition showing either a first or a second orientation state, means for orienting the ferroelectric liquid crystal to either one of the first and second orientation states at respective picture elements, and duration-controlling means for controlling the duration of the first or second orientation state at respective picture elements.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the basic operation principle of a liquid crystal device used in the present invention;

FIG. 3 is a diagram for illustrating a driving control circuit used in the present invention;

FIG. 4 and FIGS. 5A to 5D are explanatory views for illustrating one example of gradation data allotted to respective picture elements;

FIGS. 10A to 10D show voltage waveforms of inversion signals used in a second or third field;

FIGS. 11, 15 and 24 are respectively plan views of matrix electrode structures with display states used in the present invention;

FIGS. 16A to 16F, FIGS. 18A to 18F, FIGS. 20A to 20F and FIGS. 22A to 22F respectively show waveforms of signals applied to scanning or data lines in other embodiments of driving according to the present invention;

FIGS. 28A and 28B show an example of driving signal waveforms comprising those of FIGS. 25A, 25C, 27A and 27C respectively followed by an alternating current; FIGS. 28C to 28F show voltage waveforms applied to picture elements for writing by using signals shown in FIGS. 28A and 28B;

DESCRIPTION OF THE PREFERRED EMBODIMENTS

Figure 6:
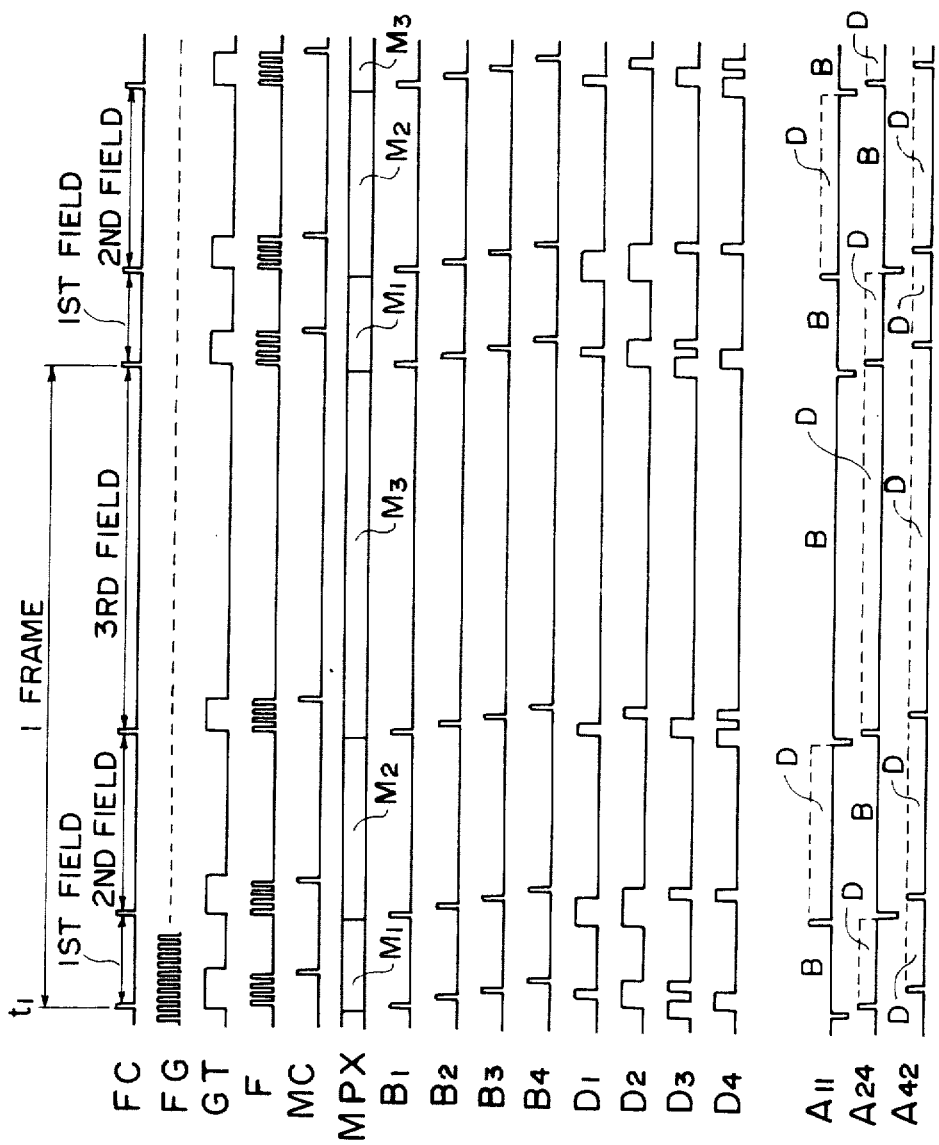
FIG. 6 is a timing chart used in the driving method according to the present invention.

As an optical modulation material used in the driving method according to the present invention, a material which shows either a first optically stable state (assumed to give, e.g., a bright state) or a second optically stable state (assumed to give, e.g., a dark state) depending upon an electric field applied thereto, i.e., has bistability with respect to the applied electric field, particularly a liquid crystal having the above-mentioned property, may be used.

Preferable liquid crystals having bistability which can be used in the driving method according to the present invention are chiral smectic liquid crystals having ferroelectricity, among which chiral smectic C (SmC*)—, H (SmH*)—, I (SmI*)—, F (SmF*)— or G (SmG*)— phase liquid crystals are suitable. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

More particularly, examples of ferroelectric liquid crystal compounds usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcylidene-4'-octylaniline (MBRA8), etc.

When a device is constituted using these materials, the device may be supported with a block of copper, etc., in which a heater is embedded in order to realize a temperature condition where the liquid crystal compounds assume a smectic phase.

Referring to FIG. 1, there is schematically shown an example of a ferroelectric liquid crystal cell for explanation of the operation thereof. Reference numerals 11 and 11a denote base plates (glass plates) on which a transparent electrode of, e.g., $In_2O_3$, $SnO_2$, ITO (Indium-Tin Oxide), etc., is disposed, respectively. A liquid crystal of, e.g., an SmC*-phase in which liquid crystal molecular layers 12 are oriented perpendicular to surfaces of the glass plates is hermetically disposed therebetween. Full lines 13 show liquid crystal molecules. Each liquid crystal molecule 13 has a dipole moment (P⊥) 14 in a direction perpendicular to the axis thereof. When a voltage higher than a certain threshold level is applied between electrodes formed on the base plates 11 and 11a, a helical structure of the liquid crystal molecule 13 is loosened or unwound to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1μ), the helical structure of the liquid crystal molecules is loosened even in the absence of an electric field whereby the dipole moment assumes either of the two states, i.e., P in an upper direction 24 or Pa in a lower direction 24a as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented in either of a first stable state 23 (bright state) and a second stable state 23a (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented to the second stable state 23a, whereby the directions of molecules are changed. This state is also kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

The driving method according to the present invention may be applicable to a ferroelectric liquid crystal cell placed under bistability condition not only by the regulation of the cell thickness as described above but also by using a chiral smectic liquid crystal having a negative dielectric anisotropy ordinarily with spiral structure or texture and applying thereto an alternating voltage. The alternating voltage for creating bistability condition may also be applied to a chiral smectic liquid crystal having a negative dielectric anisotropy with non-spiral structure due to the regulation of the cell thickness.

FIG. 3 is a diagram of a liquid crystal display driving circuit for practicing an embodiment of the driving method according to the present invention.

Referring to FIG. 3, DSP represents a liquid crystal display unit wherein $A_{11}$, $A_{12}$, ... $A_{44}$ denote respective picture elements. M1, M2 and M3 are frame memories each having a memory capacity of $4 \times 4 = 16$ bits. Data are sent through a data bus DB to the memories M1, M2 and M3 which are controlled by a control bus CB with respect to writing/readout and addressing.

FC is a field switching signal, DC a decoder therefor, MPX a multiplexer for selecting one of outputs of the memories M1, M2 and M3, M4 a monostable multivibrator, GT a gate signal, FG a clock oscillator, CK a clock signal, AND an AND gate, F a row-scanning clock signal, CNT a counter, SR a series input/parallel output shift register, DR1-DR4 column-driving circuits, and DR5-DR8 row-driving circuits.

The operation of the circuit shown in FIG. 3 will be explained with reference to FIGS. 4 to 6.

FIG. 4 represents gradation data applied to respective picture elements during one frame period (period required for forming one picture frame). With respect to a set of gradation data, the most significant bit MSB is input to the memory M3, the medium bit to the memory M2 and the least significant bit LSB to the memory M1 respectively through the data bus.

At a time $t_1$, as a field switching signal FC is generated, the multiplexer MPX is so set as to select data from the memory M1. Simultaneously, the FC is input to the monostable multivibrator MM to generate a gate signal GT, whereby the AND gate is opened and four unit clock signals of a clock signal CK is output therefrom as a row-scanning signal F to the counter CNT. The counter CNT turns on the driver DR5 at the first unit clock signal. At this time, the data on the first row of the memory M1 are input to the shift register SR and only the driver DR3 is turned on. As a result, a liquid crystal picture element $A_{13}$ alone is set at the dark level, while the other liquid crystal picture elements $A_{11}$, $A_{12}$ and $A_{14}$ are set at the bright level. Then, the row-scanning signal F is also input to a controller (not shown) as a memory row switching signal, whereby the next second row data from the memory M1 are input to the shift register SR. At a subsequent scanning signal F, the driver DR is turned on and the second row data from the memory M1 are simultaneously input to the drivers DR1-DR4, respectively. At this time, the drivers DR2, DR3 and DR4 are turned on whereby the picture elements $A_{22}$, $A_{23}$ and $A_{24}$ are set at the dark level, while $A_{21}$ is set at the bright level. The operations are repeated with respect to the third and fourth rows.

When a fourth row-scanning signal F is input to the counter CNT, the counter CNT outputs a memory switching signal MC to a controller (not shown), whereby the memory M2 is on service and a second field operation commences. At this time, the respective states of the picture elements set in the first field operation are retained since each picture element comprises a ferroelectric liquid crystal of a non-spiral structure having a memory characteristic.

Also in the second field, at a field switching signal FC, the multiplexer MPX selects data from the memory M2 and, at a gate signal GT, a row-scanning signal F is input to the counter CNT and the shift register SR. Then, row scanning is carried out in the same cycle as in the first field, whereby the respective picture elements are set at the dark or bright level, and the display states are maintained for a period twice as long as that in the first frame period.

The operation in the third field is likewise conducted.

In this embodiment, the ratios among the periods of the first, second and third fields are set at 1:2:4 like those among the weights allotted to the respective bits for the gradation data. Thus, the gradation data for the picture element $A_{11}$, for example, is 2 as shown in FIG. 5D, and the picture element $A_{11}$ is set at the dark level only during the second field period and for 2/7 of the one frame period. The picture element $A_{24}$ has gradation data of 5, set at the dark level during the first and third field periods while kept at the bright level during the second field period and placed in the dark state for 5/7 of the one frame period. Further, the picture element $A_{42}$ has gradation data of 7 and is placed in the dark level for the all of the field periods. As a result, in this embodiment, display at 8 levels of gradation ranging from 0 to 7 is made possible.

As explained above, an apparent half tone can be realized by controlling a display duty, i.e., a proportion of a display period (e.g., a bright state period or dark state period) during one frame period.

After the completion of the third field operation, i.e., the one frame operation, the memories M1 to M3 are rewritten by the control bus CB and the data bus DB and data for the subsequent frame are stored in the memories.

In this embodiment, one frame is divided into three fields, a half tone of display can be realized if one frame is divided into a plurality, i.e., two or more, fields. Further, varying weights, preferably a geometric series of weight (e.g., 1:2:4: . . . :$2^n$; n is a positive integer) are allotted to the respective field periods in the same portions as those allotted to the data bits. However, the respective field periods may also be allotted to have the same weight, i.e., the same duration.

Figure 7A:
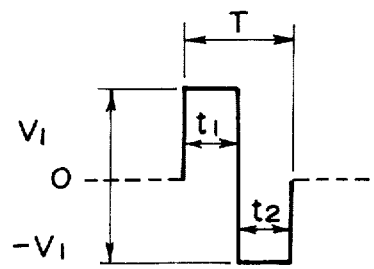
FIGS. 7A to 7D are views showing waveforms of signals applied to scanning or data lines for driving.
Figure 7B:
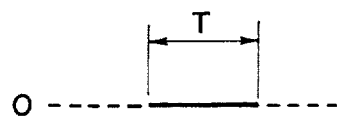
Figure 7C:
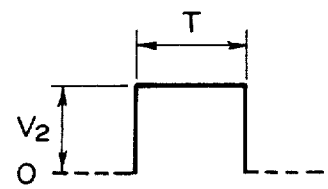
Figure 7D:
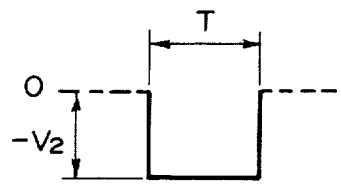

FIGS. 7A and 7B respectively show an electric signal applied to scanning lines $B_1$, $B_2$, $B_3$ and $B_4$, wherein FIG. 7A shows a scanning signal waveform and FIG. 7B shows a non-scanning signal waveform. FIGS. 7C and 7D respectively show a picture image signal applied to data lines $D_1$, $D_2$, $D_3$ and $D_4$, wherein FIG. 7C shows a signal waveform driving a picture element comprising a bistable ferroelectric liquid crystal to, e.g., its "bright" state and FIG. 7D shows a signal waveform to the "dark" state. Herein a threshold voltage for giving a first stable state of a liquid crystal cell having bistability is referred to as $V_{th1}$ (a threshold value for giving the "bright" state) and a threshold voltage for giving a second stable state of the liquid crystal cell as $-V_{th2}$ (a threshold value for the "dark" state), the scanning signal shown in FIG. 7A is an alternating voltage showing $V_1$ at a phase (time) $t_1$ and $-V_1$ at a phase (time) $t_2$. By applying such an alternating voltage as a scanning signal, it is possible to obtain an important effect that switching between the first and second stable states of the liquid crystal respectively corresponding to optically "bright" and "dark" states can be rapidly caused. On the other hand, scanning lines to which a scanning signal is not applied are placed in grounded condition so that an electric signal appearing thereon shows zero.

Further, a voltage of $V_2$ is applied to a data line for giving a picture element in the "bright" state and $-V_2$ to a data line for giving the "dark" state.

In this instance, the voltages $V_1$ and $V_2$ are so set as to satisfy the relationships of $$V_2, (V_1-V_2)<V_{th1}<V_1+V_2$$

and $$-(V_1+V_2)<-V_{th2}--V_2, -(V_1-V_2).$$

Voltage waveforms applied to respective picture elements are given as shown in FIGS. 8A to 8D.

Figure 8A:
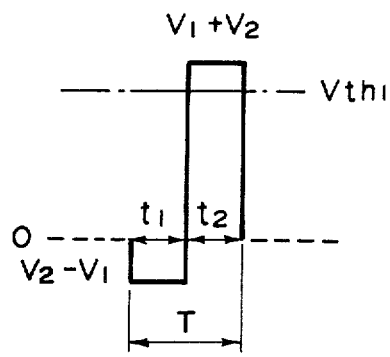
FIGS. 8A to 8D show waveforms of voltages applied to picture elements.

FIG. 8A shows a voltage waveform applied to a picture element which is on a scanning line to which a scanning signal shown in FIG. 7A is applied and on a data line to which an image signal shown in FIG. 7C is applied in synchronism with the scanning signal. Thus, to such a picture element is applied a voltage of $V_1+V_2$ exceeding the threshold voltage $V_{th1}$ at phase $t_2$. Further, as shown in FIG. 8B, a voltage of $-(V_1+V_2)$ exceeding the threshold voltage of $-V_{th2}$ is applied at phase $t_1$ to a picture element which is on the same scanning line and to which an image signal shown in FIG. 7D is applied in synchronism with the scanning signal. Accordingly, depending upon whether $V_2$ or $-V_2$ is applied to a data line on a scanning line to which a scanning signal is applied, the liquid crystal molecules are oriented to either the first stable state to form a bright state or the second stable state to form a dark state. In either case, the orientation of the liquid crystal molecules is not related to the previous states of each picture element.

Figure 8C:
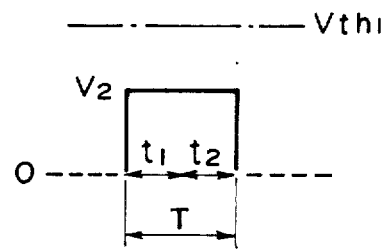
Figure 8B:
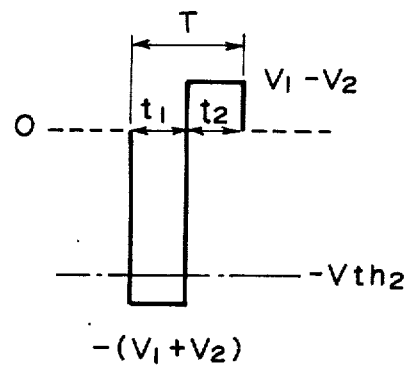
Figure 8D:
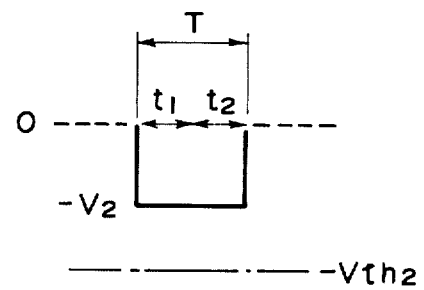

On the other hand, as shown in FIGS. 8C and 8D, the voltage applied to the picture elements on a scanning line, to which a non-scanning signal as shown in FIG. 7B is applied, is either $V_2$ or $-V_2$ which does not exceed the threshold voltages. Accordingly, the liquid crystal molecules in respective picture elements do not change their orientation states but retain signal states produced in the previous stage. Namely, when a scanning signal is applied to one scanning line, signals corresponding to the one line are written, and the signal states can be retained during one frame period or one field period, i.e., until a subsequent scanning signal is applied to the same scanning line.

Accordingly, even if the number of scanning lines is increased, the duty factor does not substantially change, resulting in no lowering in contrast at all. In this instance, the values for $V_1$ and $V_2$ and the value for the phase $(t_1+t_2)=T$ usually range from 3 volts to 70 volts and from 0.1μsec. to 2 msec., respectively, while they change depending upon the liquid crystal material and the thickness of the cell used. Herein, an important characteristic of the driving method according to the present invention is that a voltage signal alternating, e.g., between $+V_1$ and $-V_1$, is applied as a scanning signal to a scanning line in order to make it easy to cause a change from a first stable state ("bright" state when converted to an optical signal) to a second stable state ("dark" state when converted to an optical signal), or vice versa. Further, different voltages are applied to data lines in order to produce bright and dark states.

In this driving embodiment, it is preferred to set voltages $V_{ON1}$ and $V_{ON2}$ for orienting liquid crystal molecules to first and second stable states, respectively, at selected points and a voltage $V_{OFF}$ applied to non-selected points so that they differ from the average threshold voltages $V_{th1}$ and $V_{th2}$ as much as possible. Though there are differences in characteristics between devices and those in a single device, it has been confirmed preferable in view of stability that $|V_{ON1}|$ and $|V_{ON2}|$ are twice as large as $|V_{OFF}|$ or larger. In order to realize such conditions for applying voltages with the driving method explained with reference to FIGS. 7 and 8, wherein quick transition between two stable states is realized, it is preferred to set a voltage $|V_1-V_2|$ at phase $t_2$ (FIG. 8B) applied by a scanning line to which a scanning signal is applied and a non-selected data line to picture elements of no information to be given so that it will be sufficiently remote from $V_{ON1}$, particularly 1/1.2 of $V_{ON1}$ or less. The condition therefor is as follows, when the embodiment shown in FIG. 8 is taken as an example:

$$1 < |V_1(t)|/|V_2| < 10.$$

Further, referring to this condition in a generalized manner, it is not required that a voltage applied to each picture element or an electric signal applied to each electrode is symmetric or stepwise. In order to generally express the above-mentioned condition so as to include such cases, it is assumed that the maximum value of an electric signal (voltage relative to the ground potential) applied to scanning lines within a phase of $t_1+t_2$ $V_1(t)_{max}$, the minimum value thereof is $V_1(t)_{min}$, an electric signal applied to a selected data line in correspondence with information to be given is $V_2$, and an electric signal applied to a non-selected data line in correspondence with no information to be given is $V_{2a}$, respectively, in terms of voltages relative to ground potential. Then, it is preferred to satisfy the following conditions for driving in a stable manner.

$$1 < |V_1(t)_{max.}|/|V_2| < 10$$

$$1 < |V_1(t)_{min.}|/|V_2| < 10$$

$$1 < |V_1(t)_{max.}|/|V_{2a}| < 10$$

$$1 < |V_1(t)_{min.}|/|V_{2a}| < 10$$

Figure 9:
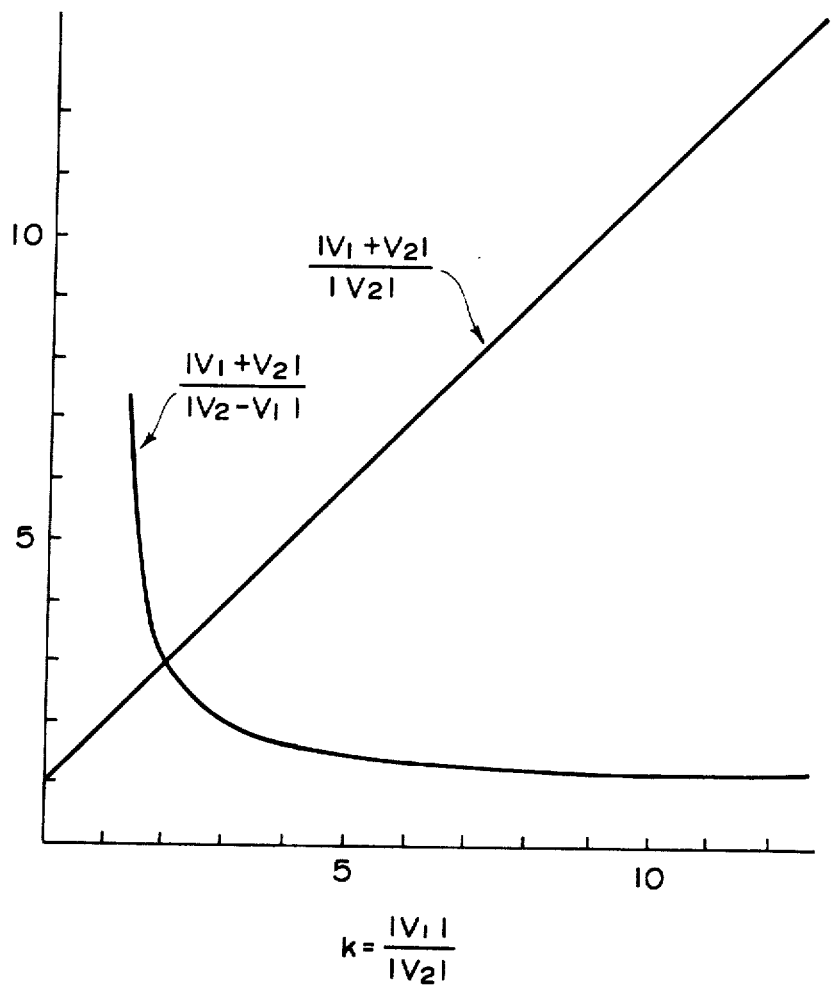
FIG. 9 is a graph showing how driving stability varies depending upon k which is an absolute value of a ratio of an electric signal $V_1$ applied to scanning lines and electric signals $\pm V_2$ applied to data lines.

In FIG. 9, the abscissa represents a ratio k of an electric signal $V_1$ applied to scanning lines to an electric signal $\pm V_2$ applied to signal electrodes, which varies on the basis of the embodiment explained with reference to FIGS. 8A to 8D. More particularly, the graph of FIG. 9 shows the variation of the ratios of a maximum voltage $|V_1+V_2|$ applied to a selected point (between a selected data line and a selected or non-selected scanning line), to a voltage $|V_2|$ applied to a non-selected point (between a non-selected data line and a selected or non-selected scanning line), and to a voltage $|V_2-V_1|$ applied at a phase of $t_1$ shown in FIG. 8A (or at a phase of $t_2$ shown in FIG. 8B) (each is expressed by an absolute value). As understood from this graph, it is preferred that the ratio $K=|V_1/V_2|$ is larger than 1, particularly within a range expressed by an inequality $1 < k < 10$.

A series of writing operations using electric signals satisfying the above relationship may be applied to the first field operation of the gradation display operation as described hereinbefore.

Then, in the second and third field periods, signal waveforms like those used in the first field period are applied for causing inversion from "black" to "white" or from "white" to "black" at desired picture elements based on the gradation data, whereby a gradation display as described hereinbefore can be realized.

As inversion signals for the second and third fields, those shown in FIGS. 10A to 10D may also be used. FIG. 10A shows a selection scanning signal, which provides an inversion signal voltage $(-2V_0)$ for converting a black picture element into a white picture element at phase $t_1$ in combination with a signal shown in FIG. 10C and an inversion signal $(2V_0)$ for converting a white picture element into a black picture element at phase $t_2$ in combination with a signal shown in FIG. 10D. FIG. 10B shows a non-selection scanning signal. A voltage of $V_0$ or $-V_0$ below the threshold voltages is applied to the picture elements on the scanning lines to which the non-selection scanning signal is applied, whereby the picture elements retain their previous display states. As a result, by selectively applying inversion voltages of $-2V_0$ or $2V_0$ to desired picture elements based on the gradation data, a gradation display can be effected.

In this instance, the writing periods for the second and third fields may be set to be the same as the writing period for the first field (e.g., 1/210 sec). More specifically, even if the writing periods for the second and third fields are respectively the same as that for the first period, the display states for the second and third fields are retained during the respective field periods, whereby the second and the third field periods may be independently set, e.g., two and four times, respectively, as long as the first field period.

Another preferred embodiment of the driving method according to the present invention will be described with reference to the drawings.

FIG. 11 shows a schematic electrode arrangement for a cell 111 with a matrix of scanning lines 112 and data lines 113 and also with a ferroelectric liquid crystal in the state of bistability (not shown) interposed therebetween.

Figure 12A:
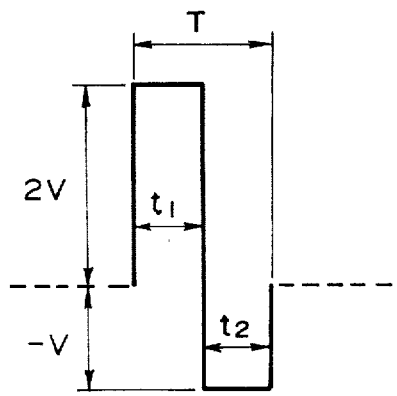
FIGS. 12A to 12D show waveforms of signals applied to scanning or data lines in another embodiment of driving according to the present invention.
Figure 12B:
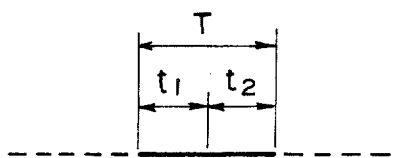
Figure 12C:
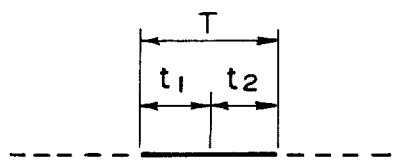
Figure 12D:
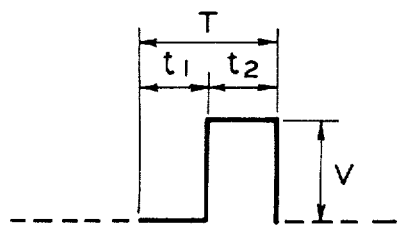

FIGS. 12A and 12B show a selection scanning signal and a non-selection scanning signal, respectively. FIG. 12C shows an electrical signal (referred to as a "white" signal) which drives a ferroelectric liquid crystal into a first stable state and FIG. 12D shows an electrical signal (referred to as a "black" signal) which drives the liquid crystal into a second stable state.

Figure 13B:
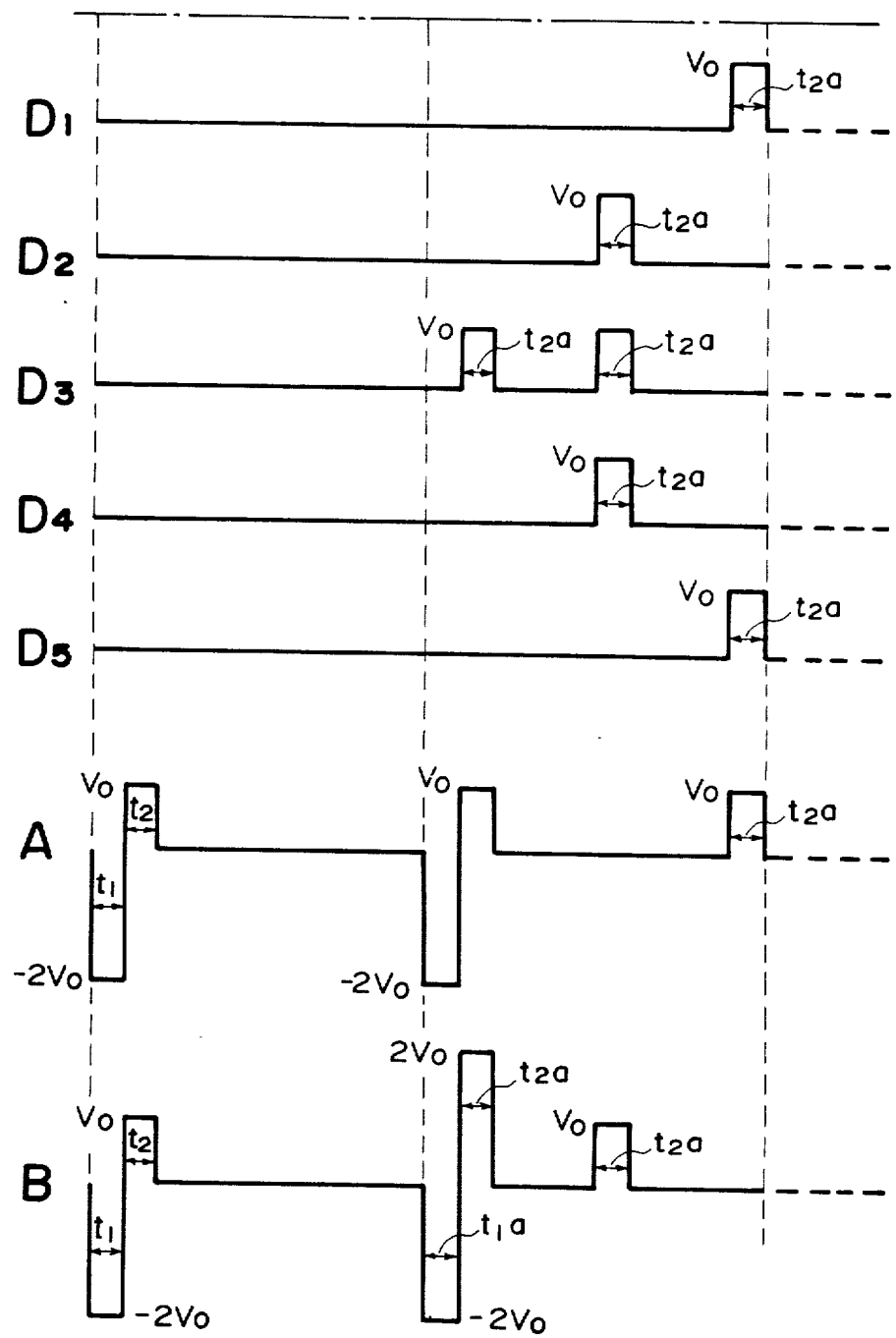
FIGS. 13 and 14 are voltage waveforms of signals applied to picture elements in clearing or erasure stage and writing stages, respectively.

First, as shown in FIG. 13 (combination of FIGS. 13A and 13B) in a clear period $Q_1$, the (selection) scanning signal is applied to the whole or a part of the scanning lines 112 and, in synchronism with the scanning signal, the "white" signal is applied to the whole or a part of the data lines 113. In a subsequent writing period $Q_2$ which may correspond to the above-mentioned first field, the "black" signal is applied to the predetermined portions as shown in FIG. 11 (black picture elements). FIG. 13 shows the waveforms of the voltages applied to the picture elements A and B (FIG. 13B), respectively, as shown in FIG. 11 and the electrical signals applied to the scanning lines 112 (FIG. 13A) and to the data lines 113 (FIG. 13B).

$V_0$ is so selected that the following relations may be satisfied:

$V_0 < V_{th1} < 2V_0$, and $-V_0 > -V_{th2} > -2V_0$.

Therefore, as is clear from FIG. 13, $-2V_0$ is applied during the phase $t_1$ to all picture elements on the scanning lines to which the scanning signal is applied (or to the picture elements to be rewritten in the case of partial rewriting) so that the ferroelectric liquid crystal is driven into the first stable state. During the phase $t_2$, the voltage applied to the picture elements is $V_0$ which is below $V_{th1}$ so that the first state ("white") into which the liquid crystal has been driven during the phase $t_1$ can be maintained. As described above, during the clear period $Q_1$, all the picture elements are once erased to "white" in response to the "white" signal. Thereafter, during the writing period $Q_2$, the "black" signal which is in synchronism with the scanning signal is applied to the data lines so that only the predetermined picture elements become "black". Thus, one black-and-white picture is formed. In this case, $2V_0$ is applied during the phase $t_{2a}$ to the picture element to which the "black" signal is applied after $-2V_0$ has been applied during the phase $t_{1a}$. As $2V_0 > V_{th1}$, the ferroelectric liquid crystal which is oriented to the first stable state during the phase $t_{1a}$ is caused to be driven into the second stable state during the phase $t_{2a}$ and consequently becomes "black".

The voltage V and the phase T $(=t_1+t_2)$ are dependent upon a liquid crystal used and the thickness of a cell, but in general the voltage is 3–70 V while the phase is in a range between 0.1 μsec and 2 msec.

Figure 14A:
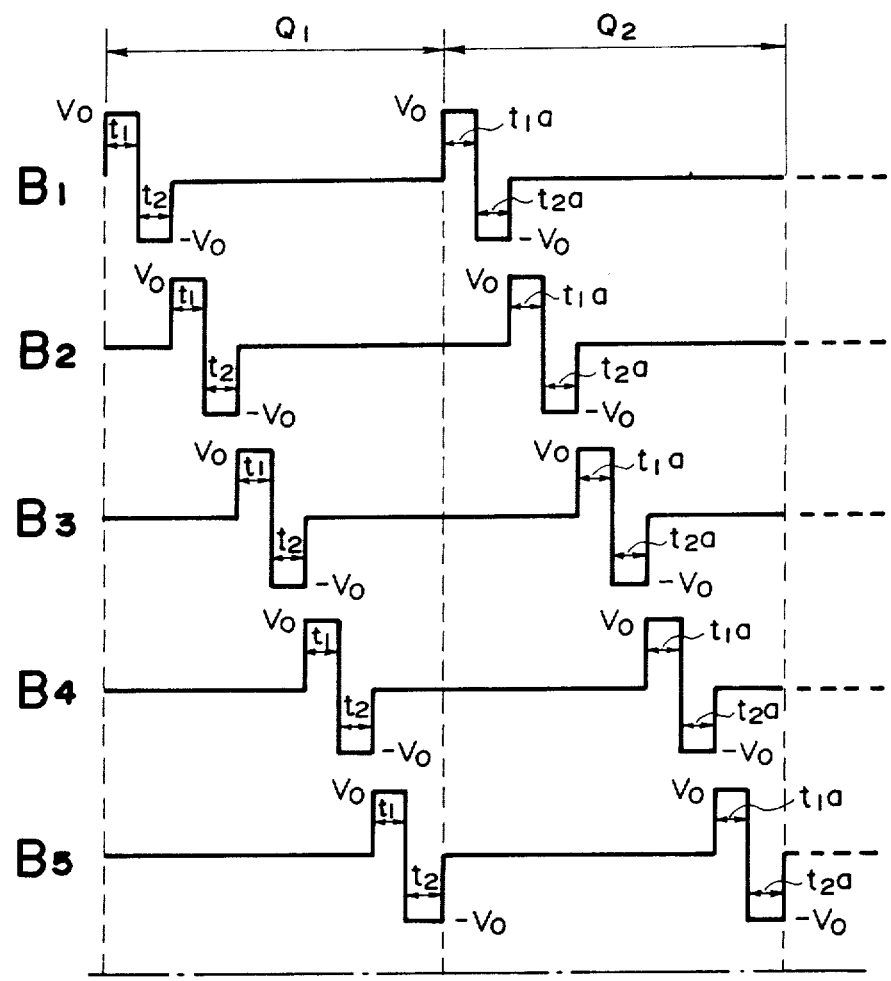
Figure 14B:
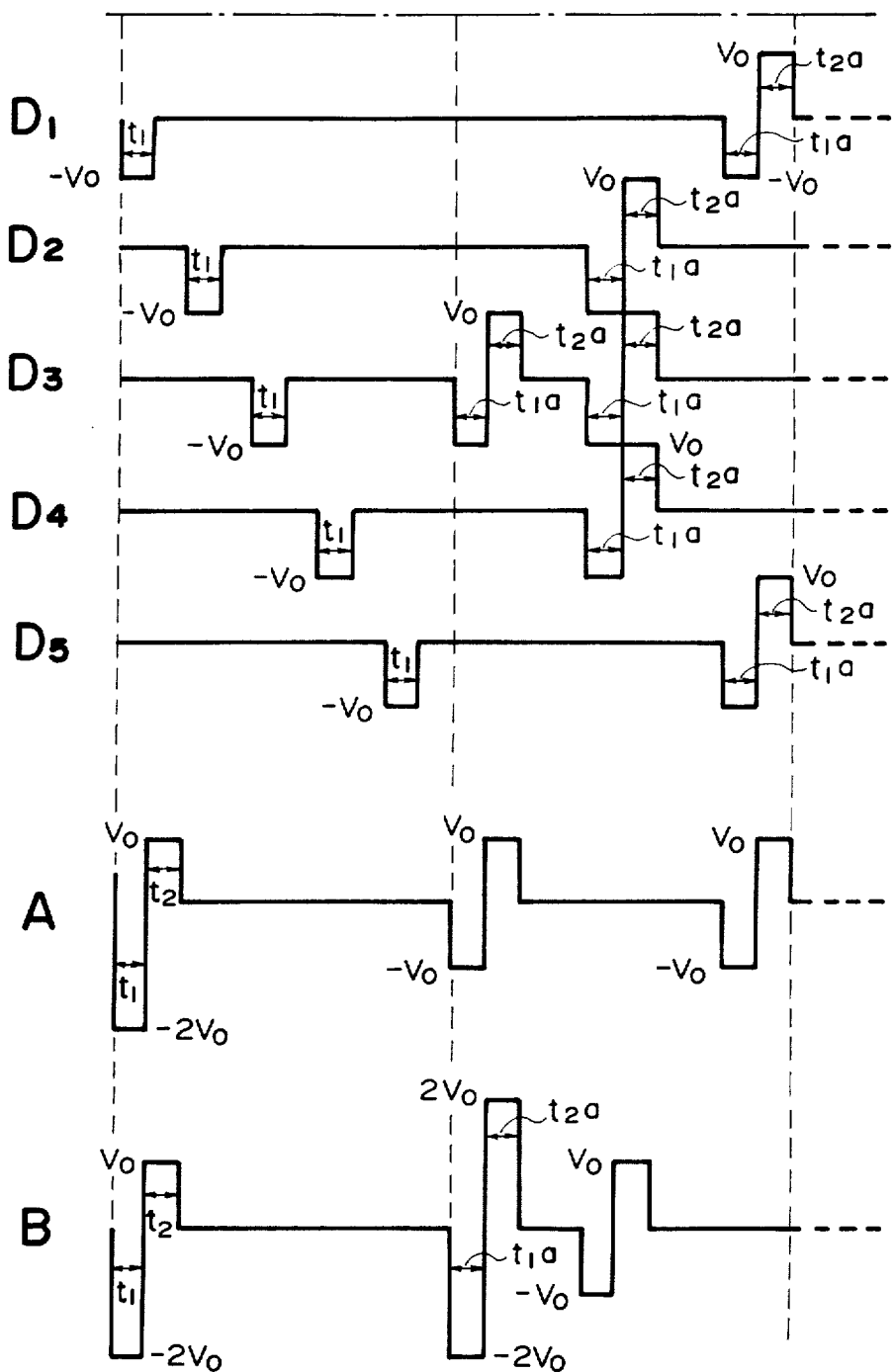

FIG. 14 (combination of FIG. 14A and FIG. 14B) is a view used to explain a further embodiment of of the driving method in accordance with the present invention. In this embodiment, a scanning signal is sequentially applied to the scanning electrodes 112 as shown in FIG. 11 and, in synchronism with the scanning signal, a "white" signal is applied to the data lines 113, so that the whole picture once becomes "white" during a clear period $Q_1$. In this case, $-2V_0$ is applied to each picture element during the phase $t_1$ and then $V_0$ which is lower than $V_{th1}$ is applied during the phase $t_2$. Accordingly, the ferroelectric liquid crystal is driven into and maintained in the first stable state during the phases $t_1$ and $t_2$. Thereafter, a "black" signal is applied only to predetermined picture elements during a subsequent writing period $Q_2$. The picture element (the black picture element B shown in FIG. 11) to which the "black" signal is to be applied, is applied with $-2V_0$ during a phase $t_{1a}$ and then with $2V_0$ during a phase $t_{2a}$. As a result, the ferroelectric liquid crystal in the picture element is driven into the second stable state. The picture element B is applied with $-V_0$ and $V_0$, wherein $V_0$ satisfies the following relations as described before: $V_0 < V_{th1} < 2V_0$, and $-V_0 > V_{th2} > -2V_0$, so that the picture element B will not be inverted to "white".

Thus, the writing operation of a first field is completed as the operation in the writing period $Q_2$ in the manner as explained above. Then, in the second and third field periods, signals like those shown in FIGS. 12C and 12D are applied in synchronism with scanning signals like those shown in FIGS. 12A and 12B which are used in the first field (the writing period $Q_2$) in order to cause inversion from "black" to "white" or from "white" to "black" at desired picture elements, whereby a gradation display as explained hereinbefore can be realized.

It may well be understood that inversion signals shown in FIGS. 10A to 10D (i.e., unit signals shown in FIG. 14) may be used instead of the signals shown in FIGS. 12A to 12D (i.e., unit signals shown in FIG. 13) for causing inversion at desired picture elements in the second and third fields.

Herein, the writing periods for the second and third fields may be set to be the same as the writing period for the first field (e.g., 1/210 sec). More specifically, even if the writing periods for the second and third fields are respectively the same as that for the first period, the display states for the second and third fields are retained during the respective field periods, whereby the second and the third field periods may be independently set, e.g., twice and thrice, respectively, as long as the first field period.

Another preferred embodiment of the driving method according to the present invention is explained with reference to FIG. 15.

Figure 16D:
Figure 16E:
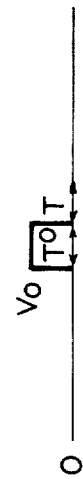
Figure 16F:
Figure 16A:
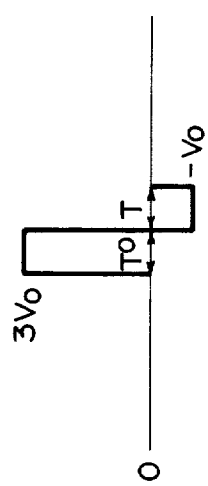
Figure 16B:
Figure 16C:

FIG. 15 is a schematic view of a cell 151 with a matrix of electrodes comprising scanning lines 152 and data lines 153, and a bistable ferroelectric liquid crystal interposed therebetween. For the sake of brevity, a simple case in which binary signals of black and white are displayed will be described. In FIG. 15, the hatched picture elements represent "black" while the white picture elements, "white". FIG. 16A shows an electric signal applied to a selected scanning line; FIG. 16B shows an electrical signal applied to the other scanning electrodes (non-selected scanning electrodes); and FIGS. 16C and 16D respectively show electrical signals applied to a selected data line (which represents "black"). More particularly, FIG. 16C shows an electrical signal applied to a selected data line where the preceding electrical signal has represented "black", while FIG. 16D shows an electrical signal applied to a selected data line where the preceding electrical signal has represented "white". FIGS. 16E and 16F show electrical signals applied to the signal electrodes which are not selected (and which represent "white"). More particularly, FIG. 16E shows an electrical signal applied to non-selected data lines where the preceding electrical signal has represented "black" while FIG. 16F shows an electrical signal applied to the non-selected data lines where the preceding electrical signal has represented "white".

Figure 17:
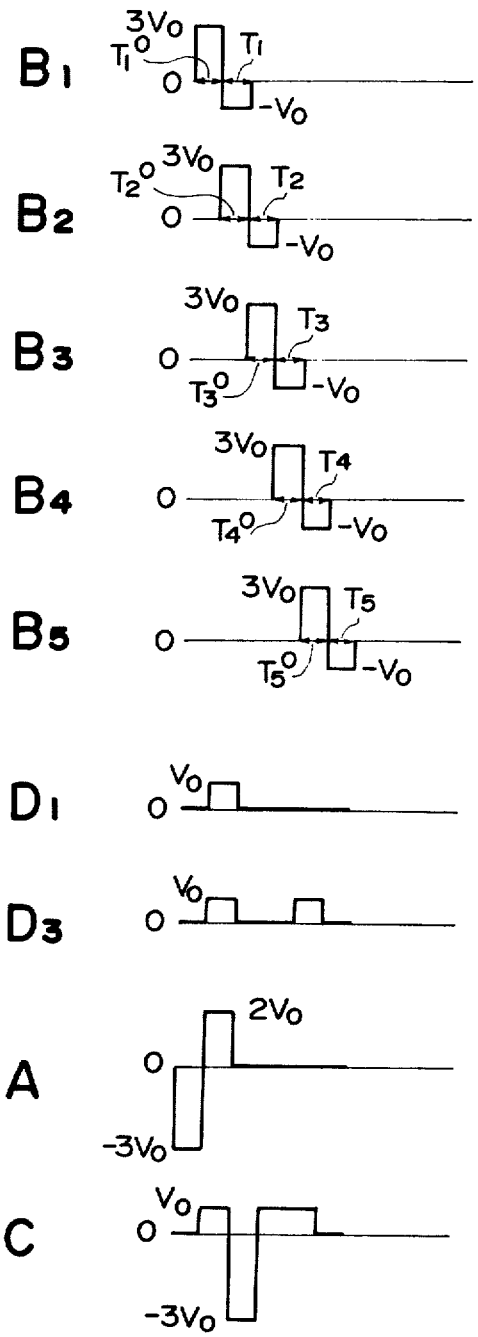
FIGS. 17, 19, 21 and 23 respectively show waveforms of voltages applied to respective picture elements according to other embodiments of the present invention.

In a phase $T^0$, all the picture elements on one scanning line once become "white"; and in a phase T, an information signal is written. In this embodiment, $T^0=T=\Delta t$. FIG. 17 shows driving waveforms when the pattern as shown in FIG. 15 is displayed by using the electrical signals as shown in FIG. 16. In FIG. 17, $B_1$-$B_5$ represent signals applied to the scanning lines; $D_1$ and $D_3$, signals applied to the data lines $D_1$ and $D_3$, respectively; and A and C, waveforms of voltages applied to the picture elements A and C, respectively, shown in FIG. 15. A threshold voltage when it is applied for a time period of $\Delta t$ in order to drive a bistable liquid crystal into a first stable state (in which a picture element becomes "white") is represented by $-V_{th2}$, while a threshold voltage when it is applied for a time period of $\Delta t$ in order to drive the bistable liquid crystal into a second stable state (in which a picture element becomes "black") is represented by $V_{th1}$. Then, the value of $V_0$ is so selected that the following relations may be satisfied:

$$V_0 < V_{th1} < 2V_0, \text{ and}$$

$$-2V_0 < -V_{th2} < -V_0.$$

As is clear from FIG. 17, all the picture elements on one scanning electrode are caused to become "white" once and thereafter "black" or "white" is selected in response to information. In the case of a picture element which represents "black", the inversion or reversal from "white" to "black" occurs, whereby the information is written. When the writing of information into the picture elements on one scanning line (Nth line) is being carried out within a predetermined phase (time period), the operation for causing all the picture elements on the next scanning line (n+1 th line) to become "white" is simultaneously carried out. Thus, one writing operation for writing one picture can be effected and applied to the operation of the first field as shown in FIG. 6.

Then, in the second and third field periods, signal waveforms like those used in the first field period are applied for causing inversion from "black" to "white" or from "white" to "black" at desired picture elements based on the gradation data, whereby a gradation display as described hereinbefore can be realized.

As inversion signals for the second and third fields, those shown in FIGS. 10A to 10D may also be used. FIG. 10A shows a selection scanning signal, which provides an inversion signal voltage ($-2V_0$) for converting a black picture element into a white picture element at phase $t_1$ in combination with a signal shown in FIG. 10C and an inversion signal ($2V_0$) for converting a white picture element into a black picture element at phase $t_2$ in combination with a signal shown in FIG. 10D. FIG. 10B shows a non-selection scanning signal. A voltage of $V_0$ or $-V_0$ below the threshold voltages is applied to the picture elements on the scanning lines to which the non-selection scanning signal is applied, whereby the picture elements retain their previous display states. As a result, by selectively applying inversion voltages of $-2V_0$ or $2V_0$ to desired picture elements based on the gradation data, a gradation display can be effected.

In this instance, the writing periods for the second and third fields may be set to be the same as the writing period for the first field (e.g., 1/210 sec). More specifically, even if the writing periods for the second and third fields are respectively the same as that for the first period, the display states for the second and third fields are retained during the respective field periods, whereby the second and the third field periods may be independently set, e.g., two and four times, respectively, as long as the first field period.

Figure 19:
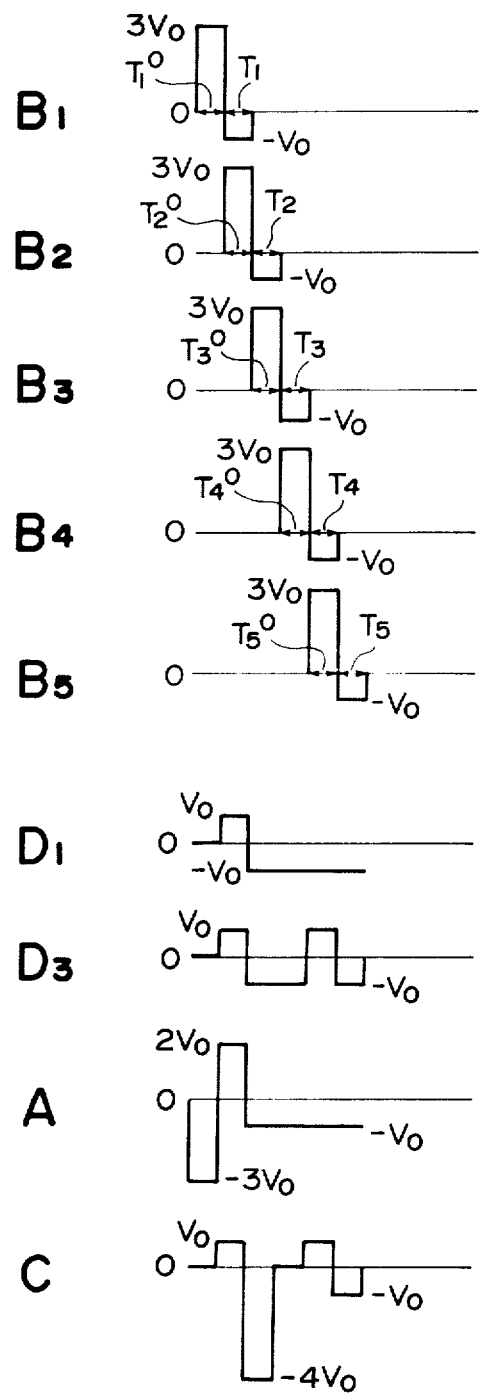

Another embodiment for writing according to the driving method in accordance with the present invention is shown in FIGS. 18 and 19. FIG. 18A shows an electric signal applied to a selected scanning line; and FIG. 18B shows an electric signal applied to non-selected scanning lines. FIGS. 18C to 18F show electrical signals applied to the data lines. FIGS. 18C and 18E show the information signals applied when the preceding signal has represented "black", while FIGS. 18D and 18F show the information signals applied when the preceding signal has represented "white". In FIGS. 18C and 18D, an information signal $V_0$ for representing "black" is shown as being applied in a phase T, while an information signal $-V_0$ for representing "white" is shown as being applied in the phase T in FIGS. 18E and 18F.

FIG. 19 shows driving waveforms when the pattern as shown in FIG. 15 is displayed. In FIG. 19, $B_1$-$B_5$ represent signals applied to the scanning lines $B_1$-$B_5$; $D_1$ and $D_3$ represent the signals applied to $D_1$ and $D_3$, respectively; and A and C represent the waveforms of the voltages applied to the picture elements A and C, respectively, of the pattern shown in FIG. 15.

In a preferred embodiment for writing in the driving method in accordance with the present invention, there is provided an auxiliary signal phase $T^2$ in order to prevent the continuous application of an electric field in one direction as will be described in detail with reference to FIGS. 20 and 21 hereinafter.

Figure 20D:
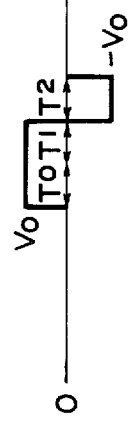
Figure 20E:
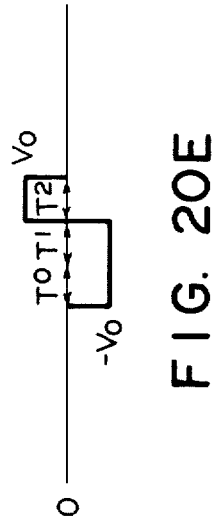
Figure 20F:
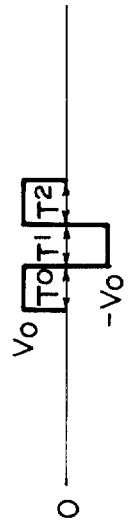
Figure 20A:
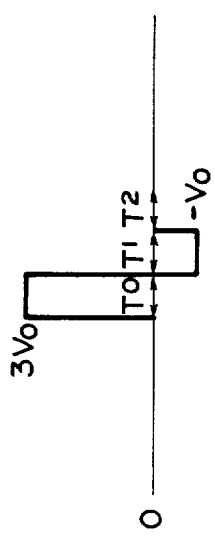
Figure 20B:
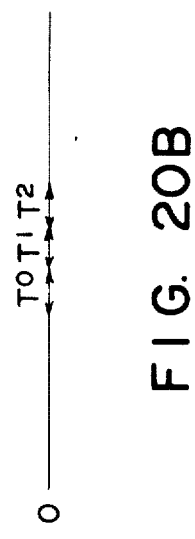

FIG. 20A shows an electrical signal applied to a selected scanning line; and FIG. 20B, an electrical signal applied to non-selected scanning lines. As shown in FIGS. 20C-20F, during a phase $T^2$, signals with a polarity opposite to that of the information signal applied in the phase $T^1$ (corresponding to "black" in FIGS. 20C and 20D, and "white" in FIGS. 20E and 20F are applied to data lines. This will be described in more detail in conjunction with the display of the pattern as shown in FIG. 15. In the case of the driving method without the phase $T^2$, the picture element A becomes "black" in response to the scanning of the scanning line $B_1$, but there arises a problem that the picture element A is erratically inverted to "white" because, when the scanning lines $B_2$, $B_3$ and so on are successively scanned, the electrical signal of $-V_0$ is continuously applied to the data line $D_1$ and hence to the picture element A. However, if an auxiliary signal phase $T^2$ is provided as described above, there arises no problem of crosstalk as is clear from the time serial signals shown in FIG. 20.

Figure 20C:
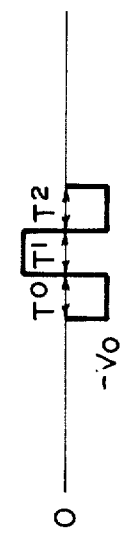

FIGS. 20C and 20E show electrical signals applied when the preceding signal has represented "black", while FIGS. 20D and 20F show electrical signals applied when the preceding signal has represented "white".

Figure 21:
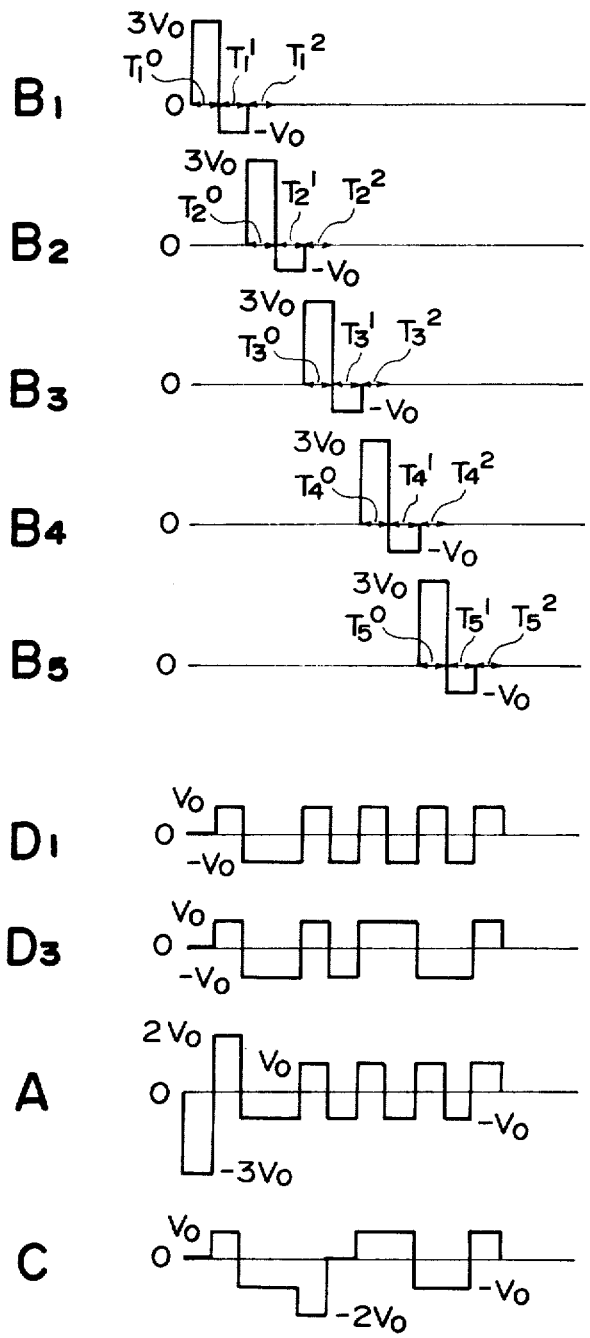

FIG. 21 shows driving waveforms used to display a pattern as shown in FIG. 15. In FIG. 21, $B_1$-$B_5$ represent signals applied to the scanning lines $B_1$-$B_5$; $D_1$ and $D_3$ represent signals applied to the signal electrodes $D_1$ and $D_3$, respectively; and A and C represent the waveforms of the voltages applied to the picture elements A and C, respectively, as shown in FIG. 15.

A further embodiment for writing in the driving method in accordance with the present invention will be described with reference to FIGS. 22 and 23. In this embodiment, $V_0$, $Vth_1$ and $Vth_2$ are so selected that the following relations may be satisfied:

$$V_0 < Vth_1 < 3V_0, \text{ and}$$

$$-3V_0 < -Vth_2 < -V_0.$$

FIG. 22A shows an electrical signal applied to a selected scanning line; and FIG. 22B, an electrical signal applied to non-selected scanning lines.

Meanwhile, an optimum time interval of the auxiliary signal phase $T^2$ is dependent upon the magnitude of a voltage applied to a data line. When a voltage with a polarity opposite to that of a voltage applied during the information signal phase $T^1$ is applied, it is preferred in general that, when a higher voltage is applied, the time period of the phase $T^2$ is shorter while, when a lower voltage is applied, the time period is longer. However, when the time period is long, it takes a long time to scan the whole picture. As a result, it is preferable to set $T^2 \leq T^1$.

FIGS. 22C-22F show information signals applied to the data lines. FIGS. 22C and 22E show information signals applied when the preceding signal has represented "black", while FIGS. 22D and 22F show information signals applied when the preceding signal has represented "white". In FIGS. 22C and 22D, an information signal $V_0$ for representing "black" is applied during the phase $T^1$, and an information signal $V_0$ for representing "white" is applied during the phase $T^1$.

Figure 23:
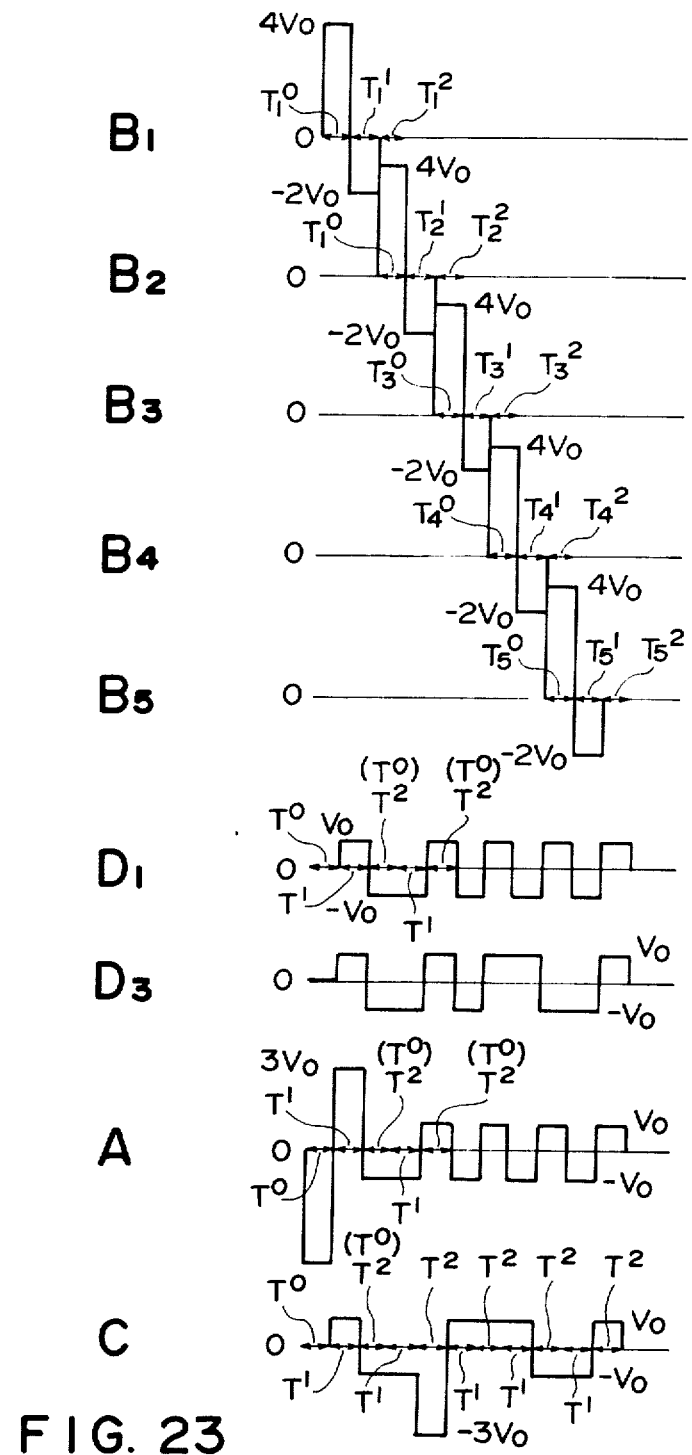

FIG. 23 shows driving waveforms used when the pattern as shown in FIG. 15 is displayed. In FIG. 23, $B_1$-$B_5$ represent signals applied to the scanning lines $B_1$-$B_5$; $D_1$ and $D_3$, signals applied to the data lines $D_1$ and $D_3$, respectively; and A and C, the waveforms of the voltages applied to the picture elements A and C, respectively, as shown in FIG. 15.

Figure 24:
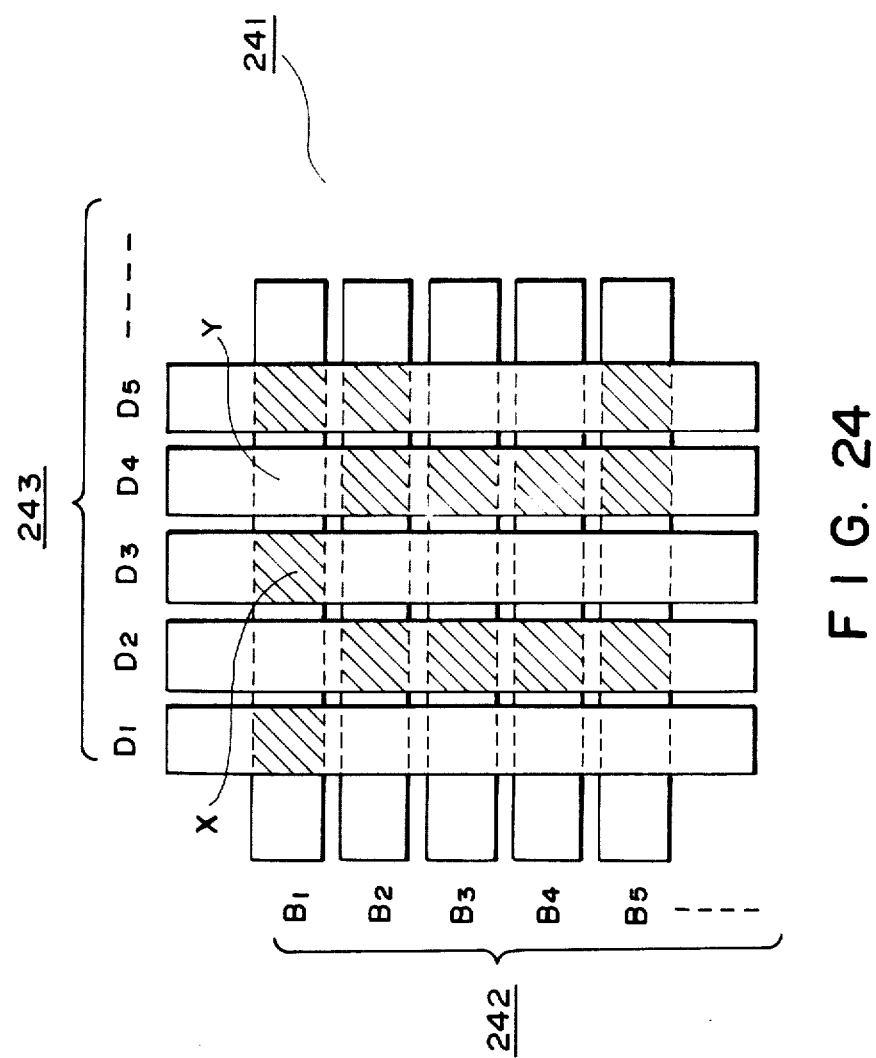

FIG. 24 is a schematic view of a cell 241 with a matrix of electrodes comprising scanning lines 242 and data lines 243, and a bistable ferroelectric liquid crystal (not shown) interposed therebetween. For the sake of brevity, a case in which binary signals of white and black are displayed is explained. In FIG. 24, the hatched picture elements represent "black", while the other picture elements, "white".

FIGS. 25A to 25D show signal waveforms used in a first stage for writing "black" in the whole or a prescribed part of the picture elements at phase $t_2$. Further, FIGS. 27A to 27D show signal waveforms used in a second stage for writing "white" in the remaining picture elements after the completion of the first stage.

Figure 25A:
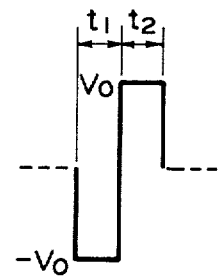
FIGS. 25A to 25D show an example of driving signal waveforms during a stage for writing "black", while FIGS. 27A to 27D "white"
Figure 25B:
Figure 25C:
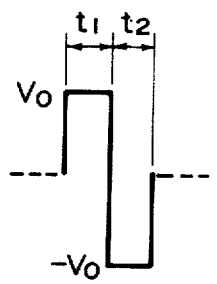
Figure 25D:
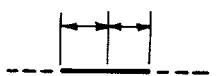

FIG. 25A shows a selection scanning signal applied to scanning lines during the black writing stage and FIG. 25B shows a non-selection scanning signal applied during the black-writing stage. FIG. 25C shows a black signal waveform applied to data lines for writing black, and FIG. 25D shows signal waveforms applied to the other data lines.

Figure 26A:
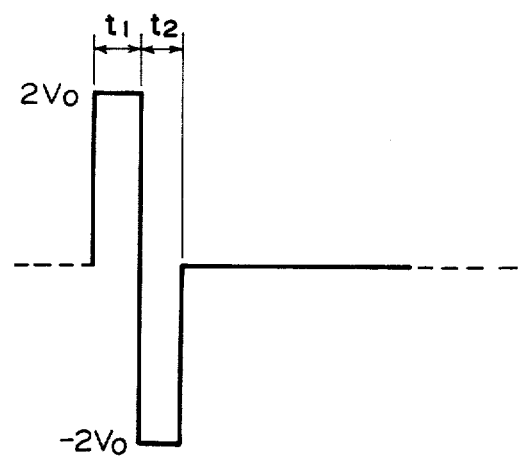
FIGS. 26A and 26B show waveforms of voltages applied to picture elements when the driving waveforms as shown in FIGS. 25A to 25D are used for writing "black"
Figure 26B:
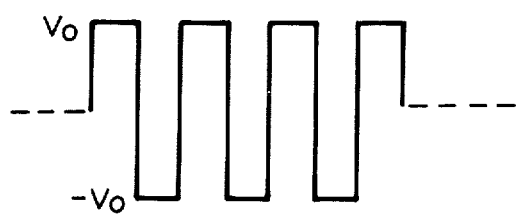

FIGS. 26A and 26B show voltage signal waveforms applied in time series to the picture elements X and Y, respectively, in FIG. 24 in the first writing stage by using the signals shown in FIGS. 25.

Figure 27A:
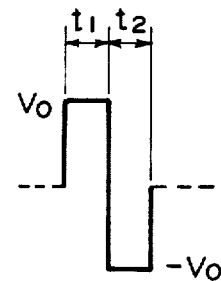
Figure 27B:
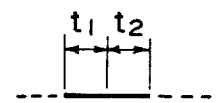
Figure 27C:
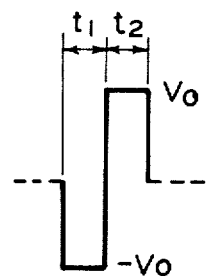
Figure 27D:
Figure 29A:
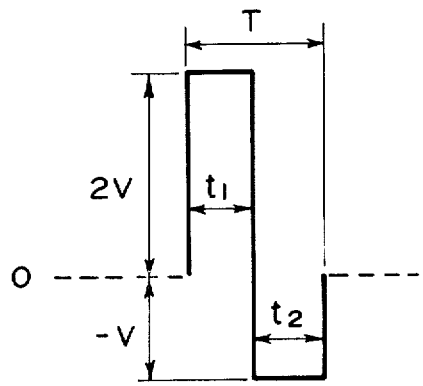
FIGS. 29A to 29D and FIGS. 31A to 31D respectively show waveforms of signals applied to scanning or data signals in another embodiment of driving according to the present invention.
Figure 29B:
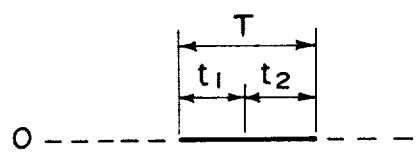
Figure 29C:
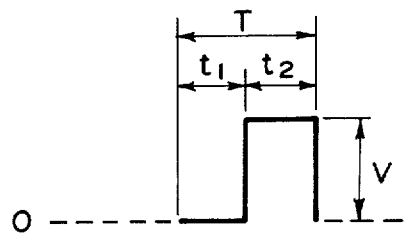
Figure 29D:
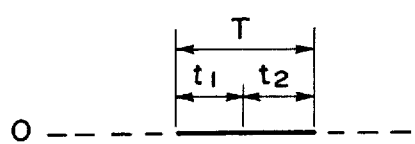
Figure 30C:
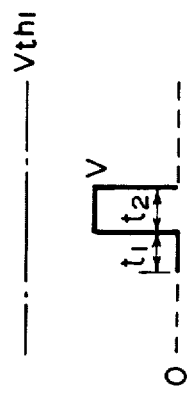
FIGS. 30A to 30D and FIGS. 32A to 32D show waveforms of voltages applied to picture elements when driving signals shown in FIGS. 29 and FIGS. 31, respectively, are used.
Figure 30D:
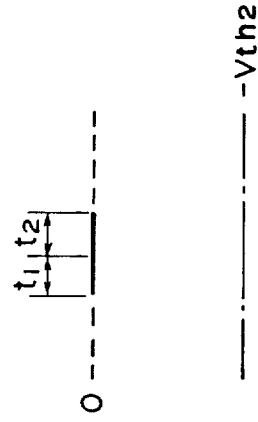
Figure 30A:
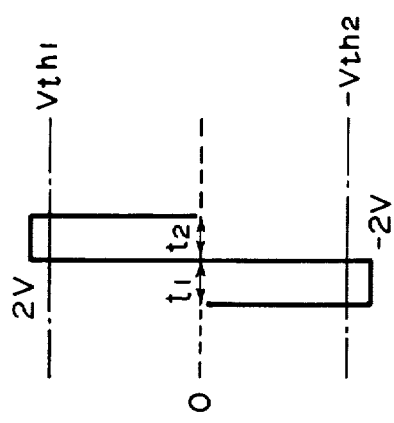
Figure 30B:
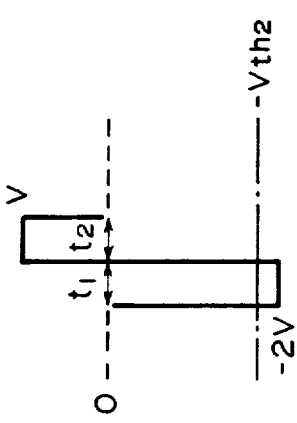
Figure 31A:
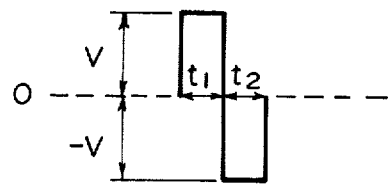
Figure 31B:
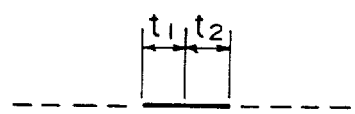
Figure 31C:
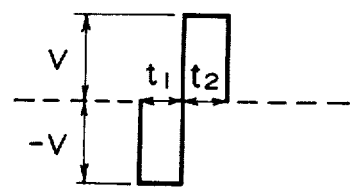
Figure 31D:
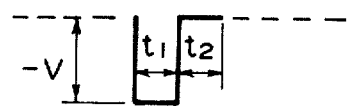
Figure 32A:
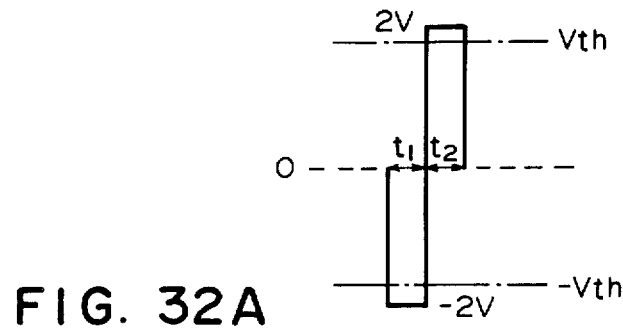
Figure 32B:
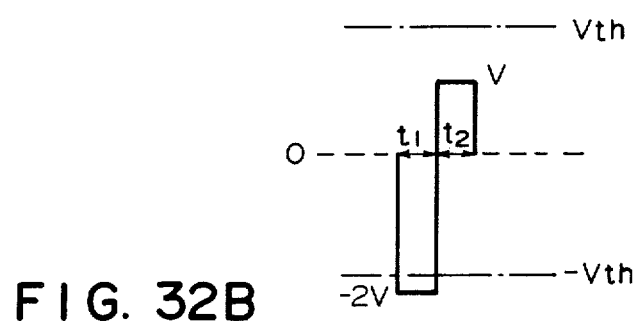
Figure 32C:
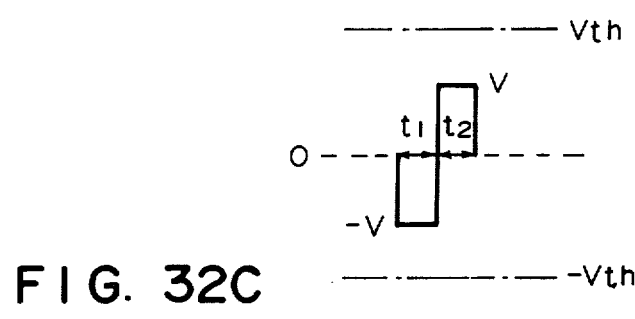
Figure 32D:
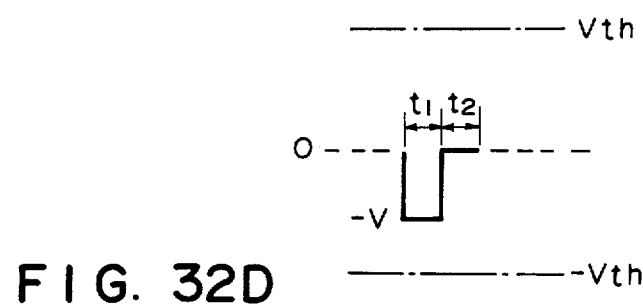

FIGS. 27A and 27B show a selection scanning signal and a non-selection scanning signal, respectively, applied to scanning lines at the time of writing "white". FIG. 27C shows a white signal waveform applied to data lines for writing "white" and FIG. 27D shows signal waveforms applied to the other data lines, respectively, at the time of writing "white".

FIGS. 28A to 28D show another embodiment for writing in the driving method according to the present invention. FIG. 28A shows a signal which comprises a scanning signal as shown in FIG. 25A for writing "black" followed by an alternating signal waveform 281. FIG. 28B shows a signal which comprises a scanning signal as shown in FIG. 27A for writing "white" followed by an alternating signal waveform 282. FIG. 28C shows a voltage signal waveform applied in time series to the picture element X in FIG. 24 by the combination of the scanning signal for writing "black" shown in FIG. 28A and the signals for writing "black" shown in FIGS. 25C and 25D combined in series. FIG. 28D shows a voltage signal applied in time series to the picture element Y in FIG. 24 by the combination of the scanning signal shown in FIG. 28D and the repetition of the signal shown in FIG. 25D. Similarly two types of voltages as shown in FIGS. 28E and 28F for writing "white" in the second stage are obtained by the combination of the signal shown in FIG. 28B with the combination of the signals shown in FIG. 27C and FIG. 27D and with the repetition of the signal shown in FIG. 27D, respectively. The signal shown in FIG. 28E is applied to a desired picture element, e.g., one at the intersection of the row $B_1$ and the column $D_5$ in FIG. 24 to rewrite it into "white". Thus, according to this embodiment, an alternating voltage not exceeding the threshold voltages is applied to the picture elements written in "black" or "white" within the first or second writing stage, whereby the written display states can be further effectively retained, i.e., memorized.

A series of writing operations comprising the first stage for writing "black" and the second stage for writing "white" by using the signals shown in FIGS. 25 to 28 to write a picture may be applied to the first field operation as described hereinbefore.

Then, in the second and third field periods, signal waveforms like those used in the first field period are applied for causing inversion from "black" to "white" or from "white" to "black" at desired picture elements based on the gradation data, whereby a gradation display as described hereinbefore can be realized.

As inversion signals for the second and third fields, those shown in FIGS. 10A to 10D may also be used. FIG. 10A shows a selection scanning signal, which provides an inversion signal voltage ($-2V_0$) for converting a black picture element into a white picture element at phase $t_1$ in combination with a signal shown in FIG. 10C and an inversion signal ($2V_0$) for converting a white picture element into a black picture element at phase $t_2$ in combination with a signal shown in FIG. 10D. FIG. 10B shows a non-selection scanning signal. A voltage of $V_0$ or $-V_0$ below the threshold voltages is applied to the picture elements on the scanning lines to which the non-selection scanning signal is applied, whereby the picture elements retain their previous display states. As a result, by selectively applying inversion voltages of $-2V_0$ or $2V_0$ to desired picture elements based on the gradation data, a gradation display can be effected.

In this instance, the writing periods for the second and third fields may be set to be the same as the writing period for the first field (e.g., 1/210 sec). More specifically, even if the writing periods for the second and third fields are respectively the same as that for the first period, the display states for the second and third fields are retained during the respective field periods, whereby the second and the third field periods may be independently set, e.g., two and four times, respectively, as long as the first field period.

FIGS. 29 and 30 show another embodiment for writing in the driving method according to the present invention. FIG. 29A shows a scanning signal applied to scanning lines; FIG. 29B shows a non-scanning signal applied to scanning lines; and FIGS. 29C and 29D show information signals for writing "bright" and "dark" states (corresponding to "bright" and "dark" signals) respectively in the picture elements on the scanning lines to which a scanning signal is applied. As a result, FIG. 30A shows a voltage waveform applied to picture elements to which a writing signal as shown in FIG. 29C is applied among the picture elements on the scanning line to which a scanning signal is applied. FIG. 30B is a voltage waveform applied to picture elements to which a signal as shown in FIG. 29D is applied among the picture elements on the same scanning line. FIGS. 30C and 30D show voltage waveforms applied to picture elements to which signals as shown in FIGS. 29C and 29D, respectively, are applied among the picture elements on the scanning lines during non-scanning period.

In this driving embodiment, the voltage V is set to a desired value so as to satisfy $V < Vth_1 < 2V$ and $-V > -Vth_2 > -2V$, whereby one line of information written at the time of scanning is retained until a subsequent scanning signal is applied to the same scanning line.

FIGS. 31 and 32 show a variation of the embodiment explained with reference to FIGS. 29 and 30. FIGS. 31A and 31B show signal waveforms applied to scanning lines. FIGS. 31C and 31D show signal waveforms applied to data lines. FIGS. 32A and 32B show voltage waveforms applied to picture elements on a scanning line to which a scanning signal is applied. FIGS. 32C and 32B show voltage waveforms applied to picture elements on scanning lines out of scanning. One-line clearing and writing are carried out sequentially and line by line.

A series of operations as explained with reference to FIGS. 29 and 30 or FIGS. 31 and 32 may be applied to the first field operation of the gradation display operation as described hereinbefore.

Then, in the second and third field periods, signal waveforms like those used in the first field period are applied for causing inversion from "black" to "white" or from "white" to "black" at desired picture elements based on the gradation data, whereby a gradation display as described hereinbefore can be realized.

As inversion signals for the second and third fields, those shown in FIGS. 10A to 10D may also be used. FIG. 10A shows a selection scanning signal, which provides an inversion signal voltage ($-2V_0$) for converting a black picture element into a white picture element at phase $t_1$ in combination with a signal shown in FIG. 10C and an inversion signal ($2V_0$) for converting a white picture element into a black picture element at phase $t_2$ in combination with a signal shown in FIG. 10D. FIG. 10B shows a non-selection scanning signal. A voltage of $V_0$ or $-V_0$ below the threshold voltages is applied to the picture elements on the scanning lines to which the non-selection scanning signal is applied, whereby the picture elements retain their previous display states. As a result, by selectively applying inversion voltages of $-2V_0$ or $2V_0$ to desired picture elements based on the gradation data, a gradation display can be effected.

In this instance, the writing periods for the second and third fields may be set to be the same as the writing period for the first field (e.g., 1/210 sec). More specifically, even if the writing periods for the second and third fields are respectively the same as that for the first period, the display states for the second and third fields are retained during the respective field periods, whereby the second and the third field periods may be independently set, e.g., two and four times, respectively, as long as the first field period.

By adopting any of the above explained driving examples in a series of operations as illustrated by the time chart shown in FIG. 6, a gradation picture image is formed or displayed. Further, a color filter of, e.g., stripe-form or mosaic-form, may be disposed on respective picture elements to form a color liquid crystal device having bistability, and the above-mentioned driving method to such a color liquid crystal device, whereby a color image display with gradation can be realized.

Accordingly, the present invention may suitably be applied to a liquid crystal television set for displaying monochromatic or full color image with gradation, especially to a pocketable liquid crystal color television set of such characteristics which is much smaller than a conventional CRT color television set.

According to the present invention, for a display panel for display with gradation at 8 levels by setting a frame period at 1/30 sec. and a first field period at 1/210 sec., for example, as shown in FIG. 6, up to about 4750 ($1 \times 10^7/210$) scanning lines may be arranged as the response speed of the ferroelectric liquid crystal may be of the order of $0.1 \mu sec$ ($10^{-7}$ sec), where a multi-level gradation display can be realized with high density pixels. On the other hand, if the number of scanning lines is restricted to several hundreds as used in ordinary television sets, a multi-level gradation display with a number of gradation levels which is much more larger than 8 as explained above can be realized.

What is claimed is:

1. A display panel, comprising:
   a liquid crystal device comprising a plurality of picture elements arranged in a plurality of rows and columns, each picture element comprising a ferroelectric crystal under bistability condition showing either a first or a second orientation state,
   means for orienting the ferroelectric liquid crystal to either one of the first and second orientation states at respective picture elements, and
   duration-controlling means for controlling the duration of the first or second orientation state at respective picture elements.

2. The display panel according to claim 1, wherein said ferroelectric liquid crystal under bistability condition is a liquid crystal of a chiral smectic phase having a non-spiral structure.

3. The display panel according to claim 2, wherein said chiral smectic phase is a chiral smectic C phase, H phase, J phase, F phase or G phase.

4. The display panel according to claim 1, wherein said duration-controlling means comprises means for controlling the duration of the first or second orientation state at respective picture elements for each of a plurality of field periods comprised of a frame period for displaying one picture.

5. The display panel according to claim 4, wherein said frame period is divided into a plurality of field periods having different periods.

6. The display panel according to claim 5, wherein said frame period is divided into n+1 field periods having duration ratios of 1:2:4: . . . $2^n$, wherein n is a positive integer.

7. The display panel according to claim 4, wherein said frame period is divided into a plurality of field periods respectively having the same duration.

8. A display panel, comprising:
   a liquid crystal device comprising a plurality of picture elements arranged in a plurality of rows and columns, each picture element comprising a ferroelectric crystal under bistability condition showing either a first or a second orientation state,
   signal-application means for applying signals comprising a first signal for orienting the ferroelectric liquid crystal to the first orientation state and a second signal for orienting the ferroelectric liquid crystal to the second orientation state at respective picture elements on a row, and
   duration-controlling means for controlling the duration of the first or second orientation state at respective picture elements.

9. The display panel according to claim 8, wherein said first and second signals have mutually opposite directions of electric field.

10. The display panel according to claim 8, wherein said first and second signals have mutually opposite polarities.

11. The display panel according to claim 8, wherein said signal-application means applies said first signal to a selected first group of picture elements on a row at a first phase and said second signal to the remaining second group of picture elements on the same row at a second phase, said first and second signals being applied row by row.

12. The display panel according to claim 11, wherein said first and second phases are different in time from each other.

13. The display panel according to claim 12, wherein said second signal is applied after said first signal is applied.

14. The display panel according to claim 8, wherein said signal-application means applies said first signal to the whole or a part of the picture elements on a row to clear the picture elements by orienting the ferroelectric liquid crystal thereat to the first orientation state, and said second signal to a selected picture element among the cleared picture elements to write in the selected picture element by orienting the ferroelectric liquid crystal thereat to the second orientation state, said first and second signals being sequentially applied row by row.

15. The display panel according to claim 8, wherein said signal-application means applies said first signal to the whole or a part of the picture elements on a row ((N+1)th row) subsequent to a writing row (Nth row) at a first phase, and said second signal to a selected picture element on the writing row (Nth row), said first and second signals being respectively applied row by row.

16. The display panel according to claim 15, wherein said first and second phases are simultaneous with each other.

17. The display panel according to claim 8, wherein said duration-controlling means comprises means for controlling the duration of the first or second orientation state at respective picture elements for each of a plurality of field periods comprised of a frame period for displaying one picture.

18. The display panel according to claim 17, wherein said frame period is divided into a plurality of field periods having different periods.

19. The display panel according to claim 18, wherein said frame period is divided into n+1 field periods having duration ratios of 1:2:4: . . . $2^n$, wherein n is a positive integer.

20. The display panel according to claim 17, wherein said frame period is divided into a plurality of field periods respectively having the same duration.

21. A display panel, comprising:
   a liquid crystal device comprising a plurality of picture elements arranged in a plurality of rows and columns, each picture element comprising a ferroelectric crystal under bistability condition showing either a first or a second orientation state,
   signal-application means for applying a first signal for orienting the ferroelectric liquid crystal to the first orientation state picture elements constituting the whole or a part of a picture thereby to clear the picture elements, and a second signal for orienting the ferroelectric liquid crystal to the second orientation state a selected picture element among the cleared picture elements to write a display state based on the second orientation state, said second signal being applied row by row, and
   duration-controlling means for controlling the duration of the first or second orientation state at respective picture elements.

22. The display panel according to claim 21, wherein said first signal is applied row by row to the picture elements constituting said whole or a part of a picture.

23. The display panel according to claim 21, wherein said duration-controlling means comprises means for controlling the duration of the second orientation state for each of a plurality of field periods comprised of a frame period for displaying one picture.

24. The display panel according to claim 23, wherein said frame period is divided into a plurality of field periods having different periods.

25. The display panel according to claim 24, wherein said frame period is divided into n+1 field periods having duration ratios of 1:2:4: ... $2^n$, wherein n is a positive integer.

26. The display panel according to claim 23, wherein said frame period is divided into a plurality of field periods respectively having the same duration.

27. A display panel, comprising:
a liquid crystal device comprising a plurality of picture elements arranged in a plurality of rows and columns, each picture element comprising a ferroelectric crystal under bistability condition having a first orientation state and a second orientation state,
writing means for writing a display state based on the first orientation state of the ferroelectric liquid crystal in a selected first group of picture elements row by row on the whole or a part of a picture in a first stage, and writing a display state based on the second orientation state of the ferroelectric liquid crystal in a selected second group of picture elements row by row on the whole or a part of a picture in a second stage, and
duration-controlling means for controlling the duration of the first or second orientation state at respective picture elements.

28. The display panel according to claim 27, wherein said duration-controlling means comprises means for controlling the duration of the first or second orientation state at respective picture elements for each of a plurality of field periods comprised of a frame period for displaying one picture.

29. The display panel according to claim 28, wherein said frame period is divided into a plurality of field periods having different periods.

30. The display panel according to claim 29, wherein said frame period is divided into n+1 field periods having duration ratios of 1:2:4: ... $2^n$, wherein n is a positive integer.

31. The display panel according to claim 28, wherein said frame period is divided into a plurality of field periods respectively having the same duration.

32. In a method for driving a display panel of the type comprising a plurality of picture elements arranged two-dimensionally; the improved method comprising controlling display duty in a unit time period for each picture element thereby to provide a gradation.

33. The method according to claim 32, wherein each picture element comprises a pair of opposite electrodes, and a ferroelectric liquid crystal interposed between the opposite electrodes and placed under bistability condition showing either a first or second orientation state.

34. The method according to claim 33, wherein said ferroelectric liquid crystal under bistability condition is a liquid crystal of a chiral smectic phase having a non-spiral structure.

35. The method according to claim 34, wherein said chiral smectic phase is a chiral smectic C phase, H phase, I phase, F phase or G phase.

36. The method according to claim 32, wherein said display duty in a unit time period is the ratio of a field period providing a bright or dark state to a frame period for displaying one picture.

37. In a method for driving a display panel of the type comprising a plurality of picture elements arranged in a plurality of rows and columns, each picture element comprising a ferroelectric liquid crystal under bistability condition showing either a first or a second orientation state, either one of the first and second orientation states being written in respective picture elements to effect a display; the improved method comprising controlling the duration of the first or second orientation state at respective picture elements.

38. The method according to claim 37, wherein the duration of the first or second orientation state is controlled for each of a plurality of field periods comprised of a frame period for displaying one picture.

39. The method according to claim 38, wherein said plurality of field periods have different periods.

40. The method according to claim 39, wherein said frame period is divided into n+1 field periods having duration ratios of 1:2:4: ... $:2^n$, wherein n is a positive integer.

41. The method accordin9 to claim 38, wherein said plurality of field periods have the same duration.

42. In a method for driving a display panel of the type comprising a plurality of picture elements arranged in a plurality of rows and columns, each picture element comprising a ferroelectric liquid crystal under bistability condition showing either a first or a second orientation state, either one of the first and second orientation states being written in respective picture elements to effect a display; the improvement comprising:
applying row by row a first signal for orienting the ferroelectric liquid crystal to the first orientation state at a selected picture element on a row and a second signal for orienting the ferroelectric liquid crystal to the second orientation state at the remaining picture elements on the row, and
controlling the duration of the first or second orientation state at respective picture elements.

43. The method according to claim 42, wherein said first and second signals are applied in different phases of time.

44. The method according to claim 42, wherein said first and second signals are applied sequentially.

45. The method according to claim 42, wherein the duration of the first or second orientation state is controlled for each of a plurality of field periods comprised of a frame period for displaying one picture.

46. The method according to claim 45, wherein said plurality of field periods have different periods.

47. The method according to claim 46, wherein said frame period is divided into n+1 field periods having duration ratios of 1:2:4: ... $:2^n$, wherein n is a positive integer.

48. The method according to claim 42, wherein said plurality of field periods have the same duration.

49. In a method for driving a display panel of the type comprising a plurality of picture elements arranged in a plurality of rows and columns, each picture element comprising a ferroelectric liquid crystal under bistability condition showing either a first or a second orientation state, either one of the first and second orientation states being written in respective picture elements to effect a display; the improvement comprising:
applying row by row a first signal for orienting the ferroelectric liquid crystal to the first orientation state at the whole or a part of the picture elements on a row to clear the picture elements and a second signal for orienting the ferroelectric liquid crystal to the second orientation state at a selected picture element among the cleared picture elements on the row, and controlling the duration of the first or second orientation state at respective picture elements.

50. The method according to claim 49, wherein the duration of the first or second orientation state is controlled for each of a plurality of field periods comprised of a frame period for displaying one picture.

51. The method according to claim 50, wherein said plurality of field periods have different periods.

52. The method according to claim 51, wherein said frame period is divided into n+1 field periods having duration ratios of 1:2:4: ... :$2^n$, wherein n is a positive integer.

53. The method according to claim 50, wherein said plurality of field periods have the same duration.

54. In a method for driving a display panel of the type comprising a plurality of picture elements arranged in a plurality of rows and columns, each picture element comprising a ferroelectric liquid crystal under bistability condition showing either a first or a second orientation state, either one of the first and second orientation states being written in respective picture elements to effect a display; the improvement comprising:
applying row by row a first signal for orienting the ferroelectric liquid crystal to the first orientation state at the whole or a part of the picture elements on a row ((N+1)th row) subsequent to a writing row (Nth row) to clear the picture elements and a second signal for orienting the ferroelectric liquid crystal to the second orientation state at a selected picture element among the cleared elements on the writing row (Nth row), and
controlling the duration of the first or second orientation state at respective picture elements.

55. The method according to claim 54, wherein the duration of the first or second orientation state is controlled for each of a plurality of field periods comprised of a frame period for displaying one picture.

56. The method according to claim 55, wherein said plurality of field periods have different periods.

57. The method according to claim 56, wherein said frame period is divided into n+1 field periods having duration ratios of 1:2:4: ... :$2^n$, wherein n is a positive integer.

58. The method according to claim 55, wherein said plurality of field periods have the same duration.

59. In a method for driving a display panel of the type comprising a plurality of picture elements arranged in a plurality of rows and columns, each picture element comprising a ferroelectric liquid crystal under bistability condition showing either a first or a second orientation state, either one of the first and second orientation states being written in respective picture elements to effect a display; the improvement comprising:
applying a first signal for orienting the ferroelectric liquid crystal to the first orientation state to picture elements constituting the whole or a part of a picture thereby to clear the picture elements, and a second signal for orienting the ferroelectric liquid crystal to the second orientation state to a selected picture element among the cleared picture elements, and
controlling the duration of the first or second orientation state at respective picture elements.

60. The method according to claim 59, wherein the duration of the first or second orientation state is controlled for each of a plurality of field periods comprised of a frame period for displaying one picture.

61. The method according to claim 60, wherein said plurality of field periods have different periods.

62. The method according to claim 61, wherein said frame period is divided into n+1 field periods having duration ratios of 1:2:4: ... :$2^n$, wherein n is a positive integer.

63. The method according to claim 60, wherein said plurality of field periods have the same duration.

64. In a xethod for driving a display panel of the type comprising a plurality of picture elements arranged in a plurality of rows and columns, each picture element comprising a ferroelectric liquid crystal under bistability condition showing either a first or a second orientation state, either one of the first and second orientation states being written in respective picture elements to effect a display; the improvement comprising:
applying a first signal for orienting the ferroelectric liquid crystal to the first orientation state to a selected first group of picture elements row by row on the whole or a part of a picture in a first stage,
applying a second signal for orienting the ferroelectric liquid crystal to the second orientation state to a selected second group of picture elements row by row on the whole or a part of a picture in a second stage, and
controlling the duration of the first or second orientation state at respective picture elements.

65. The method according to claim 64, wherein the duration of the first or second orientation state is controlled for each of a plurality of field periods comprised of a frame period for displaying one picture.

66. The method according to claim 65, wherein said plurality of field periods have different periods.

67. The method according to claim 66, wherein said frame period is divided into n+1 field periods having duration ratios of 1:2:4: ... :$2^n$, wherein n is a positive integer.

68. The method according to claim 65, wherein said plurality of field periods have the same duration.

* * * * *

UNITED STATES PATENT AND TRADEMARK OFFICE
CERTIFICATE OF CORRECTION

PATENT NO. : 4,709,995

DATED : December 1, 1987

INVENTOR(S) : MASAKI KURIBAYASHI, ET AL.

It is certified that error appears in the above-identified patent and that said Letters Patent is hereby corrected as shown below:

SHEET 2

Figure 3, "MOMORY" should read --MEMORY--.

COLUMN 4

Lines 67-68, "M4 a monostable multi-vibrator," should read --MM a monostable multi-vibrator,--.

COLUMN 6

Line 59, "$< - V_{th2} -- V_2,$" should read --$< - V_{th2} < - V_2,$--.

COLUMN 8

Line 9, "$t_1+t_2 \ V_1(t)_{max},$" should read --$t_1+t_2$ is $V_1(t)_{max},$--.

COLUMN 15

Line 65, "and 32B" should read --and 32D--.

COLUMN 18

Line 50, "state" should read --state to--.
Line 54, "state" should read --state to--.

COLUMN 20

Line 18, "accordin9" should read --according--.

UNITED STATES PATENT AND TRADEMARK OFFICE
CERTIFICATE OF CORRECTION

PATENT NO. : 4,709,995
DATED : December 1, 1987
INVENTOR(S) : MASAKI KURIBAYASHI, ET AL.

It is certified that error appears in the above-identified patent and that said Letters Patent is hereby corrected as shown below:

COLUMN 22

Line 23, "xethod" should read --method--.

Signed and Sealed this

Seventh Day of June, 1988

Attest:

*Attesting Officer*

DONALD J. QUIGG

*Commissioner of Patents and Trademarks*